United States Patent
Menon et al.

(10) Patent No.: US 12,052,518 B2
(45) Date of Patent: Jul. 30, 2024

(54) MULTI-MODAL COMPUTATIONAL IMAGING VIA METASURFACES

(71) Applicant: University of Utah Research Foundation, Salt Lake City, UT (US)

(72) Inventors: Rajesh Menon, Salt Lake City, UT (US); Fernando Guevara Vasquez, Salt Lake City, UT (US); Apratim Majumder, Salt Lake City, UT (US)

(73) Assignee: University of Utah Research Foundation, Salt Lake City, UT (US)

(*) Notice: Subject to any disclaimer, the term of this patent is extended or adjusted under 35 U.S.C. 154(b) by 359 days.

(21) Appl. No.: 17/498,412

(22) Filed: Oct. 11, 2021

(65) Prior Publication Data
US 2022/0086372 A1 Mar. 17, 2022

Related U.S. Application Data

(63) Continuation-in-part of application No. 17/384,089, filed on Jul. 23, 2021, now abandoned.
(Continued)

(51) Int. Cl.
*H04N 25/40* (2023.01)
*G01J 3/18* (2006.01)
(Continued)

(52) U.S. Cl.
CPC ............... *H04N 25/40* (2023.01); *G01J 3/18* (2013.01); *G02B 1/002* (2013.01); *G06T 5/50* (2013.01);
(Continued)

(58) Field of Classification Search
CPC . H04N 25/40; H04N 25/76; G01J 3/18; G01J 2003/2826; G02B 1/002; G06T 5/50; G06T 2207/10024
See application file for complete search history.

(56) References Cited

U.S. PATENT DOCUMENTS 9,739,918 B2 8/2017 Arbabi et al.
10,267,956 B2 4/2019 Arbabi et al.
(Continued)

FOREIGN PATENT DOCUMENTS

CN 110133758 A 8/2019
WO WO 2019/075335 A1 4/2019
(Continued)

OTHER PUBLICATIONS

Wang, "Computational multi-spectral video imaging." Journal of the Optical Society of America, 2018, 40 pages, vol. 35, Issue 1, pp. 189-199, Washington D.C., doi.org/10.1364/JOSAA.35.000189.
(Continued)

*Primary Examiner* — Jason A Flohre
(74) *Attorney, Agent, or Firm* — Thorpe North & Western, LLP

(57) ABSTRACT

A multi-modal imaging device can include a sensor array, a metamaterial filter, and a memory unit. The sensor array can be any suitable sensor which detects incoming light and is capable of recording a received image. The metamaterial filter can be oriented adjacent the sensor array and can be patterned with pixels having varied physical heights designed to diffract an incoming image to produce an engineered response which is sensitive to 2D spatial coordinates (x, y), time (t), and at least one of depth spatial coordinate (z), spectrum (λ), and degree of polarization ($\vec{S}$). The memory unit can include instructions that, when executed by a processor, reconstruct the engineered response to produce a reconstructed image which includes the 2D spatial coordinates and at least one of z, λ, and $\vec{S}$.

26 Claims, 33 Drawing Sheets
(31 of 33 Drawing Sheet(s) Filed in Color)

Related U.S. Application Data

(60) Provisional application No. 63/055,722, filed on Jul. 23, 2020.

(51) Int. Cl.
  G01J 3/28 (2006.01)
  G02B 1/00 (2006.01)
  G06T 5/50 (2006.01)
  H04N 25/76 (2023.01)

(52) U.S. Cl.
  CPC ...... *H04N 25/76* (2023.01); *G01J 2003/2826* (2013.01); *G06T 2207/10024* (2013.01)

(56) References Cited

U.S. PATENT DOCUMENTS

| | | | |
|---|---|---|---|
| 10,412,371 B1* | 9/2019 | Chao | H04N 13/296 |
| 10,451,486 B2 | 10/2019 | Pau | |
| 10,642,074 B2 | 5/2020 | Menon | |
| 2008/0170140 A1* | 7/2008 | Silver | H04N 23/11 348/265 |
| 2017/0178296 A1* | 6/2017 | Li | G03B 13/36 |
| 2018/0052050 A1* | 2/2018 | Menon | G01J 3/2823 |
| 2018/0306915 A1 | 10/2018 | Smith et al. | |
| 2019/0108385 A1* | 4/2019 | Xiao | G06V 20/693 |
| 2019/0228507 A1 | 7/2019 | Menon et al. | |
| 2020/0014464 A1 | 1/2020 | Shrekenhamer et al. | |
| 2020/0025610 A1 | 1/2020 | Chandrasekar et al. | |
| 2020/0052027 A1* | 2/2020 | Arbabi | H04N 23/55 |
| 2020/0225386 A1* | 7/2020 | Tsai | G02B 1/002 |
| 2020/0358926 A1* | 11/2020 | Iwase | H04N 1/4486 |
| 2020/0404248 A1* | 12/2020 | Mendlovic | G06T 5/50 |
| 2021/0341658 A1* | 11/2021 | Kim | H01L 27/14621 |
| 2021/0356738 A1* | 11/2021 | Fan | G06N 3/088 |
| 2022/0221733 A1* | 7/2022 | Saari | G02B 5/1871 |

FOREIGN PATENT DOCUMENTS

| | | |
|---|---|---|
| WO | WO 2019/119025 A1 | 6/2019 |
| WO | WO 2019/148200 A1 | 8/2019 |
| WO | WO 2019/164542 A1 | 8/2019 |
| WO | WO 2019/204667 A1 | 10/2019 |

OTHER PUBLICATIONS

Shen, "Ultra-high-efficiency metamaterial polarizer," Research Article, Oct. 2014, 5 pages, vol. 1, No. 5, Washington D.C., doi.org/10.1364/OPTICA.1.000356.

Anzagira, "Application of the Quanta image sensor concept to linear polarization imaging," Journal of the Optical Society of America, Jun. 2016, 8 pages, vol. 33, Journal of the Optical Society of America, Hanover, New Hampshire, dx.doi.org/10.1364/JOSAA.33.001147.

Gao et al., "A review of snapshot multidimensional optical imaging: measuring photon tags in parallel," HHS Public Access, Feb. 2016, 79 pages, Washington D.C., doi:10.1016/j.physrep.2015.12.004.

Sattar et al.,., "Review of spectral and polarization imaging systems," Apr. 2020, 14 pages, aUniversite de Haute-Alsace,, Mulhouse, FR DOI: 10.1117/12.2555745.

Shinoda et al., "Snapshot multispectral polarization imaging using a photonic crystal filter array," Research Article, Jun. 2018, 14 pages, vol. 26, No. 12, Optics Express, Washington D.C., doi.org/10.1364/OE.26.015948.

Zhao, "Multiband Polarization Imaging," Journal, 2016, vol. 16, Article ID 5985673, 10 pages, Hindawi Publishing Corporation, London, England, doi.org/10.1155/2016/5985673.

Wang, "Computational spectroscopy via singular-value decomposition and regularization," Research Article, Aug. 2014, 10 pages, vol. 22, Optics Express, Washington D.C., DOI:10.1364/OE.22.021541.

Mueller et al., "Ultracompact metasurface in-line polarimeter," Research Article, Jan. 2016, 6 pages, vol. 3, No. 1, Optica, Washington D.C., doi.org/10.1364/OPTICA.3.000042.

Gehm, "Single-shot compressive spectral imaging with a dual-disperser architecture," Research Article, Oct. 2007, 15 pages, vol. 15, No. 21, Washington D.C.

Manakov et al, "A Reconfigurable Camera Add-On for High Dynamic Range, Multispectral, Polarization, and Light-Field Imaging," ACM Transactions on Graphics, 2013, Proceeding of SIGGRAPH, 32 (4), 13 pages, pp. 47:1-47:14, Association for Computing Machinery, Portland, Oregon.

Wetzstein, "Computational Plenoptic Imaging," 2012, 265 pages, Los Angeles, California.

\* cited by examiner (x,y,t)

2D video 3D video (x,y,z,t)

(x,y,λ,t)

Multi-spectral 2D video (x,y,z,λ,t)
Multi-spectral 3D video (x,y,z,λ,pol,t)

Multi-spectral, polarimetric 3D video

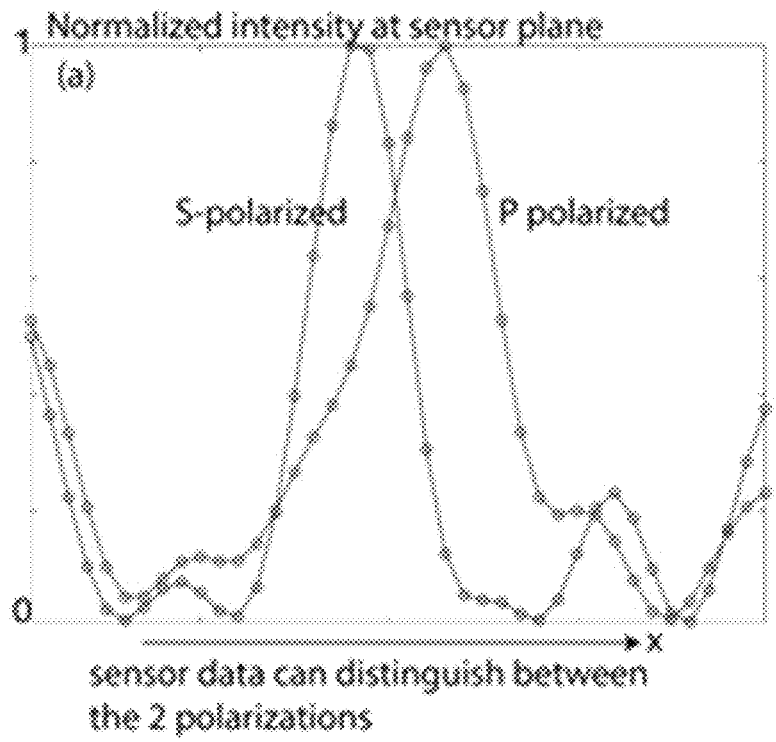
FIG. 16A
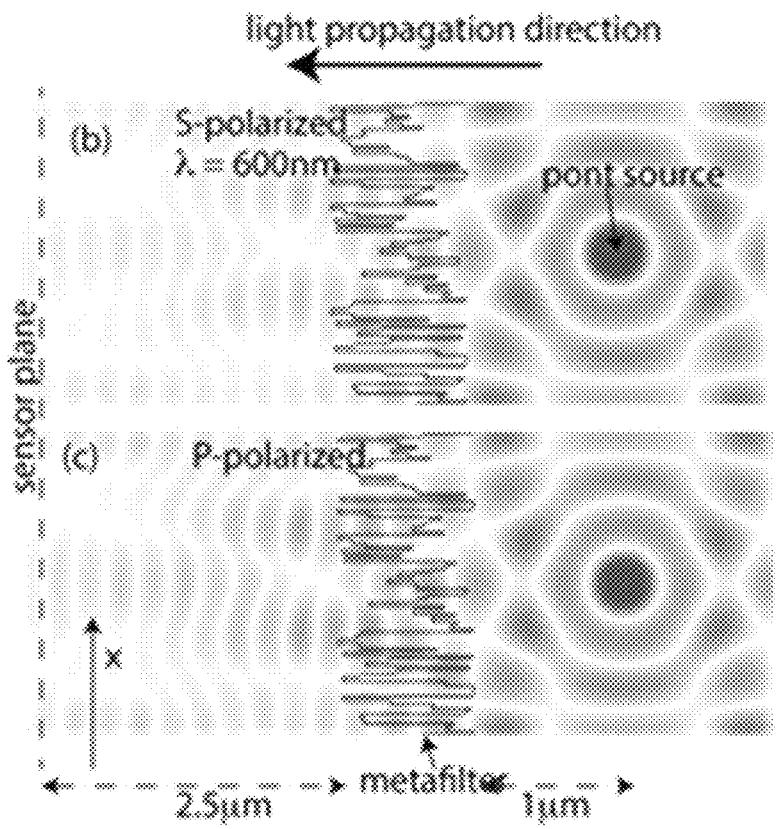
FIG. 16B
FIG. 16C

MULTI-MODAL COMPUTATIONAL IMAGING VIA METASURFACES

RELATED APPLICATION

This application is a continuation-in-part of U.S. application Ser. No. 17/384,089, filed Jul. 23, 2021 which claims priority to U.S. Provisional Application No. 63/055,722, filed Jul. 23, 2020 which is also incorporated herein by reference.

BACKGROUND

Diffractive optic elements are typically thin phase elements that operate by means of interference and diffraction to produce arbitrary distributions of light or to aid in the design of optical systems. For example, diffractive lenses can be used to reduce the number of elements in conventional lens systems and eliminate the use of exotic materials in correcting chromatic aberrations.

Diffractive optics sculpt the propagation of light to generate complex intensity and phase patterns downstream by imposing a phase and/or intensity pattern on the incident light. Phase-only diffractive optics affect the phase and are lossless. Binary-phase diffractive optics impose two-levels of phase, which significantly eases the fabrication of such elements. The phase shift is achieved via an optical-path difference between alternate zones. Such optics inherently exhibit chromatic aberrations. Generally, previous diffractive elements have been designed to operate optimally at a single wavelength, while efficiency and image contrast have been reduced at other wavelengths.

There have been various approaches to designing multiple-wavelength diffractive optics. One example includes a heterogeneous design based on materials with differing refractive indices and dispersion to compensate for chromatic aberration. By using phase shifts that are integer multiples of $2\pi$, harmonic diffractive lenses can be designed for specific discrete wavelengths. However, the selection of the design wavelengths is limited. A nonlinear optimization technique has been used to design dual-wavelength diffractive beam-splitters. Blazed higher-order diffractive optics may also be designed for multiple wavelengths. In each of these cases, the fabrication of the diffractive optic is difficult due to the multiple levels of phase-height or due to large aspect ratios. Further, while the diffractive optics may operate at multiple wavelengths, the end result is a narrowband diffractive optic.

Traditional imaging systems map one point in the object space to one point in the image space. The spatial extension of the imaged point, the point-spread function (PSF), is largely determined by far-field diffraction and aberrations present in the system. Historically, advanced lens design and manufacturing techniques were developed to minimize all kinds of aberrations to achieve the diffraction-limited PSF. Over the past decades, several methods have been extensively explored to resolve sub-diffraction features in super-resolution microscopy, by either shrinking the physical dimension of the PSF or by using statistical estimation with pre-knowledge on the shape of the PSF. However, they are not applicable to traditional photography systems.

Furthermore, electronic sensors can only detect light intensity. In order to distinguish colors, an absorbing color-filter array (generally called the Bayer filter) is placed on top of the sensor. Typically, only three colors (blue, green and red) are measured. However, natural scenes contain multi-spectral information, which can be valuable for numerous machine-vision applications. Conventional multi-spectral imagers (MSI) are expensive and cumbersome. A common MSI operates in a push-broom manner and utilizes a prism or grating to disperse light. Its applications are limited to scenarios where the MSI is scanned relative to the object such as on a satellite or on a conveyor belt. The optical design for such an MSI can be quite complex. A second category of MSI employs either liquid-crystal tunable filters or acousto-optic tunable filters to modulate the input spectrum over time. The former filter suffers from reduced throughput and slow speed, while the latter is expensive and consumes lots of power. All these techniques scan multiple 2D projections ((x, $\lambda$) or (x, y)) to acquire 3D multi-spectral data (x, y, $\lambda$), and hence, are slow. Prior art single-shot multi-spectral imagers based on coded apertures have demonstrated reasonable image quality and spectral resolution. However, the introduction of a patterned absorbing aperture, a dispersive element (prism) and relay optics increases the system size and complexity. Recently, multi-spectral sensors based on a tiled bandpass-filter array have become commercially available. Fabry-Perot (FP) resonators are integrated on CMOS sensors to achieve spectral selectivity. Unfortunately, these not only require expensive fabrication steps, but also need precise alignment between the filter and the sensor, and exhibit very poor sensitivity. These resonator-based filters may be replaced by plasmonics-based alternatives. But such alternatives incorporate sub-wavelength structures that are difficult to manufacture, and these also suffer from low sensitivity due to parasitic absorption losses. Most importantly, tiled-filter-based imagers trade-off spatial resolution with spectral resolution. Another popular method utilizes Fourier transform spectroscopy. This technique is computationally intensive, since the interferogram is Fourier transformed to yield the spectrum. Furthermore, this method enforces a fundamental trade-off between spectral resolution and imaging speed, since higher resolution requires more interferogram images to be acquired.

SUMMARY

A multi-modal imaging device can include a sensor array, a metamaterial filter, and a memory unit. The sensor array can be any suitable sensor which detects incoming light and is capable of recording a received image. The metamaterial filter can be oriented adjacent the sensor array and can be patterned with pixels having varied physical heights designed to diffract an incoming image to produce an engineered response which is sensitive to 2D spatial coordinates (x, y), time (t), and at least one of depth spatial coordinate (z), spectrum ($\lambda$), and degree of polarization ($\vec{S}$). The memory unit can include instructions that, when executed by a processor, reconstruct the engineered response to produce a reconstructed image which includes the 2D spatial coordinates and at least one of z, $\lambda$, and $\vec{S}$.

In one aspect, the device can further comprise a lens oriented opposite the metamaterial filter and in a line of sight of the incoming image such that the lens modifies the incoming image.

The engineered response can also be sensitive to coherence of the incoming image. In some cases, the engineered response is sensitive to x, y, z, t, $\lambda$, and $\vec{S}$, and optionally also coherence.

Although other sensors may be used, currently a CMOS sensor provides a good balance of performance and cost.

The metamaterial filter can most often be formed of a dielectric, and in some cases consists of or consists essentially of the dielectric.

Placement of the metamaterial filter can allow for optimization of resolution, performance, speed, and other factors. One in example, the metamaterial filter is oriented directly contacting the sensor array. This can provide simple manufacturing but some loss in resolution may be experienced. In other examples, the metamaterial filter can be spaced apart from the sensor array to form a gap. This gap can be an empty gap or can include a lens within the gap. An empty gap can allow increased resolution.

Advantageously, use of these metamaterial filters can allow the device to provide images without conventional lenses between the sensor array and the incoming image. Such conventional lenses can include but are not limited to, simple lenses and compound lenses, which include one or more of biconvex lenses, plano-convex lenses, plano-concave lenses, positive meniscus lenses, negative meniscus lenses, biconcave lenses, achromatic lenses, diffusers, mirrors, prisms, collimators, phase masks, and spatial light modulators.

Although pixel size can vary, in some cases, the pixels can have a size which is within 2% of a smallest wavelength in the incoming image or lower, and in some cases about one-tenth the smallest wavelength. Similarly, the pixels have an aspect ratio of greater than 15:1. Although not required, the incoming image may be near field, either radiative or reactive. For purposes of clarity, radiative refers to wavelengths from $\lambda/2\pi$ to the Fraunhofer distance while reactive (near field) refers to wavelengths from 0 to less than $\lambda/2\pi$.

The reconstruction can be performed using multi-stage reconstruction with both high and low resolution, e.g. high resolution image reconstruction interspersed among low resolution reconstruction time steps. In another aspect, the reconstruction is performed using inferencing from raw data. In another aspect, the reconstruction can be performed such that the reconstructed image is coarse. Such coarse images can be used merely for simple decision making. For example, confirming presence of an explosion, ripened fruit, etc. need not be high resolution.

A filter assembly can include a metamaterial filter and a memory unit as described herein above. The metamaterial filter can be adapted to be oriented adjacent a sensor array and can be patterned with pixels having varied physical heights designed to diffract an incoming image to produce an engineered response which is sensitive to 2D spatial coordinates (x, y), time (t), and at least one of depth spatial coordinate (z), spectrum ($\lambda$), and degree of polarization ($\vec{S}$). The memory unit can include instructions that, when executed by a processor: reconstruct the engineered response to produce a reconstructed image which includes the 2D spatial coordinates and at least one of z, $\lambda$, and $\vec{S}$.

A method for designing a filter for an imaging system consistent with these devices can include creating a vectorial electromagnetic model of the imaging system which includes a metamaterial filter having an array of pixel elements. The vectorial electromagnetic model can be a forward model and includes an engineered response which is sensitive to 2D spatial coordinates (x, y), time (t), and at least one of depth spatial coordinate (z), spectrum ($\lambda$), and degree of polarization ($\vec{S}$). The method can also include pptimizing heights of the pixel elements of the metamaterial filter using a gradient-based optimization algorithm to produce an optimized metamaterial filter.

These systems and methods can also be used in imaging systems, far beyond specific multi-functional camera available today. For example, inclement weather, low visibility use, autonomous driving, flight in clouds, fog, smoke, and the like.

There has thus been outlined, rather broadly, the more important features of the invention so that the detailed description thereof that follows may be better understood, and so that the present contribution to the art may be better appreciated. Other features of the present invention will become clearer from the following detailed description of the invention, taken with the accompanying drawings and claims, or may be learned by the practice of the invention.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIG. 5B is a schematic of the assembly comprised of the metamaterial filter (MF) and the sensor array. In this example, the MF has features of width 3 μm and period 18 μm and the monochrome CMOS sensor has pixel size of 6 μm.

(FIG. 7A) 2-color letter 'T'; (FIG. 7B) 3-color letter 'H'; (FIG. 7C) 4-color letters 'UTAH'; (FIG. 7D) 1-color letter 'A'; (FIG. 7E) 7-color dot-array; (FIG. 7F) rainbow.

(FIG. 8B) green; (FIG. 8C) red; (FIG. 8D) yellow; (FIG. 8E) white; (FIG. 8F) cyan and (FIG. 8G) purple colors. The errors between reconstructed and reference spectra are less than 8% in average. In these graphs, the horizontal axis is lambda nanometers and the vertical axis is spectrum (a.u.).

FIG. 10A shows reference color image of the whole test pattern over a larger frame. Five small test patterns are included. The field-of-view (FOV) of small patterns and the distance between them are labeled. FIG. 10B shows reference color images of the individual small patterns and their reconstructed RGB color images.

(FIG. 12A) Original RGB image. (FIG. 12B) Raw sensor image. (FIG. 12C) Reconstructed RGB image. (FIG. 12D) Reconstructed 9-band multi-spectral image.

FIGS. 14C and 14D correspond to $E_y$ source, while FIGS. 14E and 14F correspond to Ex source. Within the device area (dashed white square), Ey is rotated to Ex.

FIG. 16A-C show a preliminary simulation of a metafilter for distinguishing 2 linear polarization states. FIG. 16A is a graph of intensity distribution in the sensor plane.

FIG. 16B shows time-averaged intensity distributions in the XZ plane for linear S-polarization state. The metafilter pixel width=25 nm, maximum pixel depth=900 nm and the super-lattice period=2 µm. FIG. 16C shows time-averaged intensity distributions in the XZ plane for linear P-polarization state.

Figure 1:
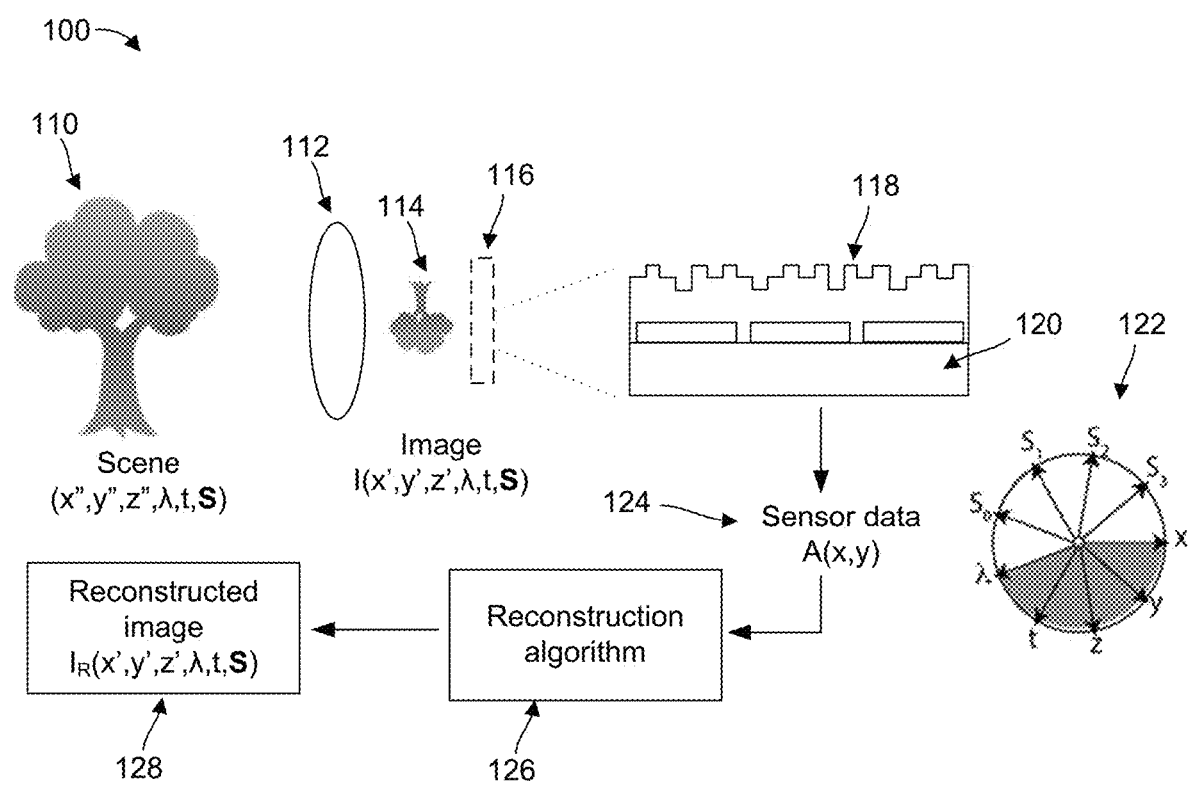
FIG. 1 is a schematic of a multi-modal imaging device in one example. A CMOS sensor is modified by the addition of an engineered metamaterial filter (metafilter). The sensor data is processed via reconstruction algorithms to extract the multi-dimensional field for each frame of the sensor. Note that only conventional imaging lenses are used in front of the sensor.

These drawings are provided to illustrate various aspects of the invention and are not intended to be limiting of the scope in terms of dimensions, materials, configurations, arrangements or proportions unless otherwise limited by the claims.

DETAILED DESCRIPTION

While these exemplary embodiments are described in sufficient detail to enable those skilled in the art to practice the invention, it should be understood that other embodiments may be realized and that various changes to the invention may be made without departing from the spirit and scope of the present invention. Thus, the following more detailed description of the embodiments of the present invention is not intended to limit the scope of the invention, as claimed, but is presented for purposes of illustration only and not limitation to describe the features and characteristics of the present invention, to set forth the best mode of operation of the invention, and to sufficiently enable one skilled in the art to practice the invention. Accordingly, the scope of the present invention is to be defined solely by the appended claims.

Definitions

In describing and claiming the present invention, the following terminology will be used.

The singular forms "a," "an," and "the" include plural referents unless the context clearly dictates otherwise. Thus, for example, reference to "a pixel" includes reference to one or more of such elements and reference to "the lens" refers to one or more of such features.

As used herein with respect to an identified property or circumstance, "substantially" refers to a degree of deviation that is sufficiently small so as to not measurably detract from the identified property or circumstance. The exact degree of deviation allowable may in some cases depend on the specific context.

As used herein, "adjacent" refers to the proximity of two structures or elements. Particularly, elements that are identified as being "adjacent" may be either abutting or connected. Such elements may also be near or close to each other without necessarily contacting each other. The exact degree of proximity may in some cases depend on the specific context.

As used herein, the term "about" is used to provide flexibility and imprecision associated with a given term, metric or value. The degree of flexibility for a particular variable can be readily determined by one skilled in the art. However, unless otherwise enunciated, the term "about" generally connotes flexibility of less than 2%, and most often less than 1%, and in some cases less than 0.01%.

As used herein, the term "metamaterial" is used to identify a patterned and engineered optical material having an array of pixels as optical elements in which individual pixels are sized less than a smallest wavelength of an incoming image. This is distinct from standard diffractive optics which individual optical elements are much larger than the smallest wavelength of the incoming image. Generally, the pixels have a size which is within 2% or less of a smallest wavelength in the incoming image. In some cases, the size is less than the smallest wavelength. In another example, the size is about one-tenth the smallest wavelength. Furthermore, individual pixel elements of a metamaterial can often have an aspect ratio of greater than 15:1.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

As used herein, the term "at least one of" is intended to be synonymous with "one or more of." For example, "at least one of A, B and C" explicitly includes only A, only B, only C, or combinations of each.

Numerical data may be presented herein in a range format. It is to be understood that such range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited. For example, a numerical range of about 1 to about 4.5 should be interpreted to include not only the explicitly recited limits of 1 to about 4.5, but also to include individual numerals such as 2, 3, 4, and sub-ranges such as 1 to 3, 2 to 4, etc. The same principle applies to ranges reciting only one numerical value, such as "less than about 4.5," which should be interpreted to include all of the above-recited values and ranges. Further, such an interpretation should apply regardless of the breadth of the range or the characteristic being described.

Any steps recited in any method or process claims may be executed in any order and are not limited to the order presented in the claims. Means-plus-function or step-plus-function limitations will only be employed where for a specific claim limitation all of the following conditions are present in that limitation: a) "means for" or "step for" is expressly recited; and b) a corresponding function is expressly recited. The structure, material or acts that support the means-plus function are expressly recited in the description herein. Accordingly, the scope of the invention should be determined solely by the appended claims and their legal equivalents, rather than by the descriptions and examples given herein.

Multi-Modal Imaging Devices

A new all-dielectric (no loss) engineered metamaterial filter (i.e., a metafilter) to enables single-shot computational imaging of the 9-dimensional field of a scene: (x, y, z), the 3D spatial co-ordinates; λ, the spectrum; t, time and the degree of polarization, $\vec{S}$, which has 4 components as well as the coherence of the electromagnetic field. This multifunctional camera can have a form factor and complexity that is orders of magnitude lower than the existing state-of-the-art.

As depicted in FIG. 1, a multi-modal imaging device 100 can include a sensor array 120, a metamaterial filter 118, and a memory unit 126. The sensor array 120 can be any suitable sensor which detects incoming light and is capable of recording a received image (e.g. CMOS etc). The metamaterial filter 118 can be oriented adjacent the sensor array 120 and can be patterned with pixels having varied physical heights designed to diffract an incoming image to produce an engineered response which is sensitive to 2D spatial coordinates (x, y), time (t), and at least one of depth spatial coordinate (z), spectrum (λ), and degree of polarization ($\vec{S}$). The memory unit 126 can include instructions that, when executed by a processor, reconstruct the engineered response to produce a reconstructed image which includes the 2D spatial coordinates and at least one of z, λ, and $\vec{S}$.

Figure 2A:
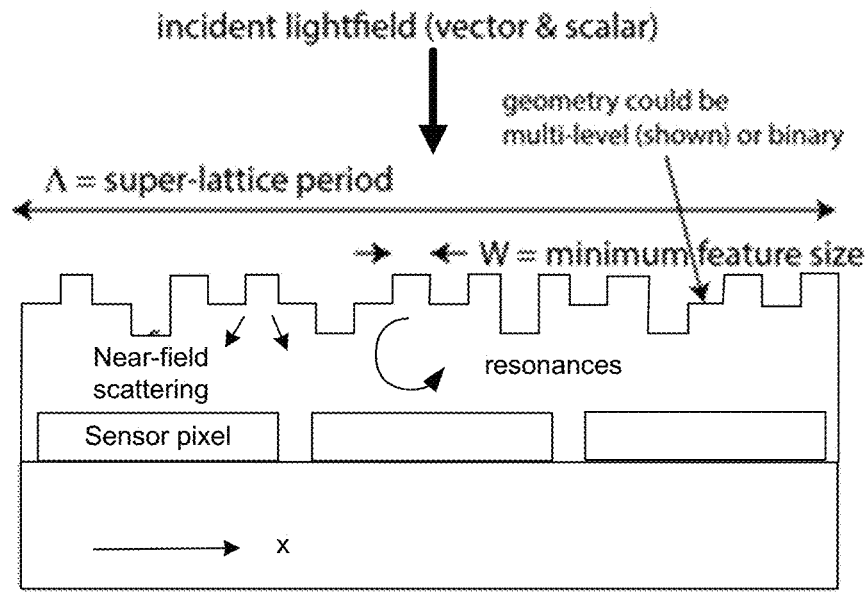
FIG. 2A is a schematic illustration of incident light field undergoing near-field scattering and multiple scattering generating guided-mode resonances.
Figure 2B:
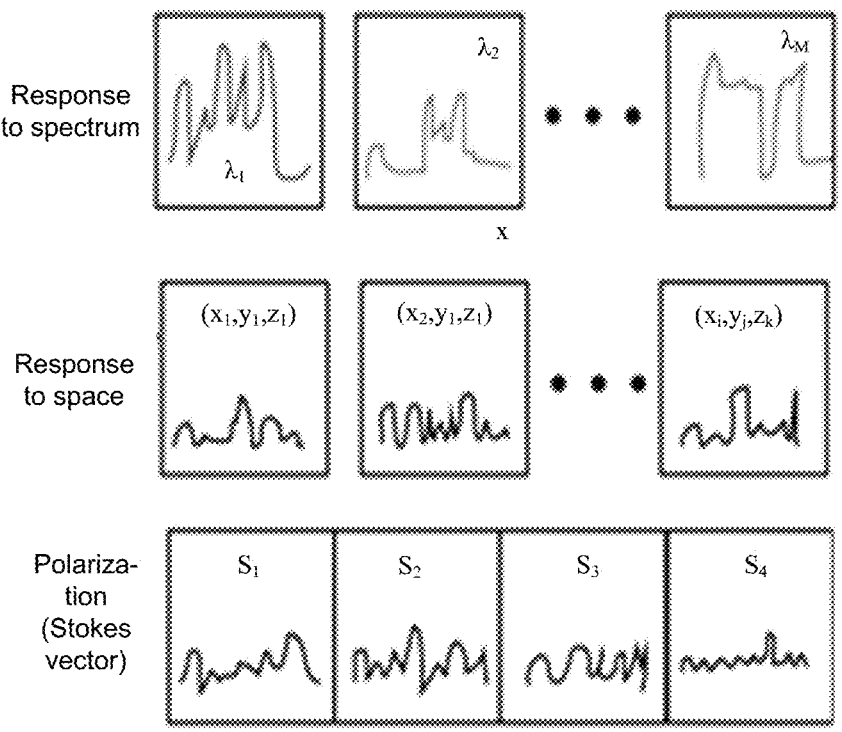
FIG. 2B is a schematic showing the result of this transformation as intensity distribution on the sensor plane that is highly dependent upon the 5-dimensional lightfield parameter space (i.e. the metafilter response on sensor sensitive to all observable parameters of spectrum, space and polarization). The metafilter can be engineered to ensure that intensity patterns on the sensor differ significantly as the lightfield parameters change as illustrated.

In some cases, the imaging device 100 can have the same form factor, cost and complexity as a conventional mobile-phone camera. In order to design the metafilter in the near-field of a conventional CMOS sensor, the metafilter can be fabricated directly onto the die surface of an unpackaged CMOS sensor. Regardless, the lens can be oriented opposite the metamaterial filter and in a line of sight of the incoming image such that the lens modifies the incoming image. More specifically, the metafilter can impose an engineered response on the incident light field that is sensitive to the observables (x, y, z, k, $\vec{S}$) for each frame (t) of the camera as illustrated in FIG. 2B. Experimental data indicate imaging of the 5D field (x, y, z, t, λ) and to indicate manipulation of polarization using metasurfaces, (x, y, z, $\vec{S}$) can be effective. This approach also allows for design of a metafilter that is able to distinguish between two linear polarizations, and coherence. Examples are summarized below.

As a theoretical framework, let the image formed by the lens on the metafilter (at each instant, t) be described as:

$$I(x',y',z',\lambda,\vec{S}) = \Sigma_{i,j,k,l,m} a_{i,j,k,l,m} \delta(x'-x'_i, y'-y'_j, z'-z'_k, \lambda-\lambda_l, \vec{S}-\vec{S}_m), \quad (1)$$

where δ is the kronecker delta function in an 8-dimensional space (x, y, z, λ and 4 components of $\vec{S}$), and the elements are the constituent values of the field that are of interest for measuring. Note that m is summed over the indices for the 4 components of the polarization vector and can be 1, 2, 3, 4 or 0, 1, 2, 3. Notably, δ=1 if equal and δ=0 if not equal.

The captured sensor data in each frame can then be described as:

$$A(x,y) = \Sigma_{i,j,k,l,m} a_{i,j,k,l,m} P(x,y;x'_i,y'_j,z'_k,\lambda_l,\vec{S}_m), \quad (2)$$

where P is the response of the metafilter, which transforms the 8-dimensional field into the two spatial dimensions (x, y) of the sensor. This is a form of spatial multiplexing. The metafilter response, P can be computed by the rigorous solution of Maxwell's equations.

Note that the last dimension of time is obtained via the native frame rate of the sensor. The metafilter response can be engineered by optimizing its constituent sub-wavelength features in multiple levels having more than two heights (2.5D as illustrated in cross-section in FIG. 2A) or as binary (2-level) structures. One objective of this design via optimization is to ensure that the inverse problem of recovering a for an arbitrary scene can be made as robust as possible. This linear inverse problem can be solved in principle via:

$$a_{i,j,k,l,m} \approx \frac{\int\int A(x,y) \times P(x,y;x'_i,y'_j,z'_k,\lambda_l,\vec{S}_m) dx dy}{\int\int P(x,y;x'_i,y'_j,z'_k,\lambda_l,\vec{S}_m) \times P(x,y;x'_i,y'_j,z'_k,\lambda_l,\vec{S}_m) dx dy}, \quad (3)$$

where the integral is performed over the sensor area that corresponds to one super-lattice period of the metafilter. This is a good approximation as long as the integral of 2 different points in the 8-dimensional space are small. One approach is to use the solution from equation (3) as the initial guess for an optimization problem that then iteratively solves for the unknown coefficients, a. One approach to design the metafilter is to minimize the largest integral between the responses, P defined as:

$$\epsilon = \max\{\iint P(x,y;x'_{i,p},y'_{j,p},z'_{k,p},\lambda_{l,p},\vec{S}_{m,p}) \times P(x,y;x'_{i,q},y'_{j,q},z'_{k,q},\lambda_{l,q},\vec{S}_{m,q}) dx dy\}, \quad (4)$$

where the subscripts p and q refer to two different points in the 5-dimensional subspace of the scene and the maximum is taken over all such point pairs. The degrees for freedom for optimization are the geometric parameters of the metafilter, defined as the heights of discrete pixels within a super-lattice as illustrated in FIG. 2A, and also include super-lattice period, Λ, minimum feature size W, and pixel coordinate x. Note that pixel heights are embedded in the definition of P. For example, a transform of P can provide filter heights with a particular material using Maxwell's equations. One the response P is known, then inverse-design methods can be applied to calculate the geometry to generate such a response. Such inverse-design methods are known such as, but not limited to, those described in U.S. Pat. No. 9,723,230 which is incorporated herein by reference.

Figure 2C:
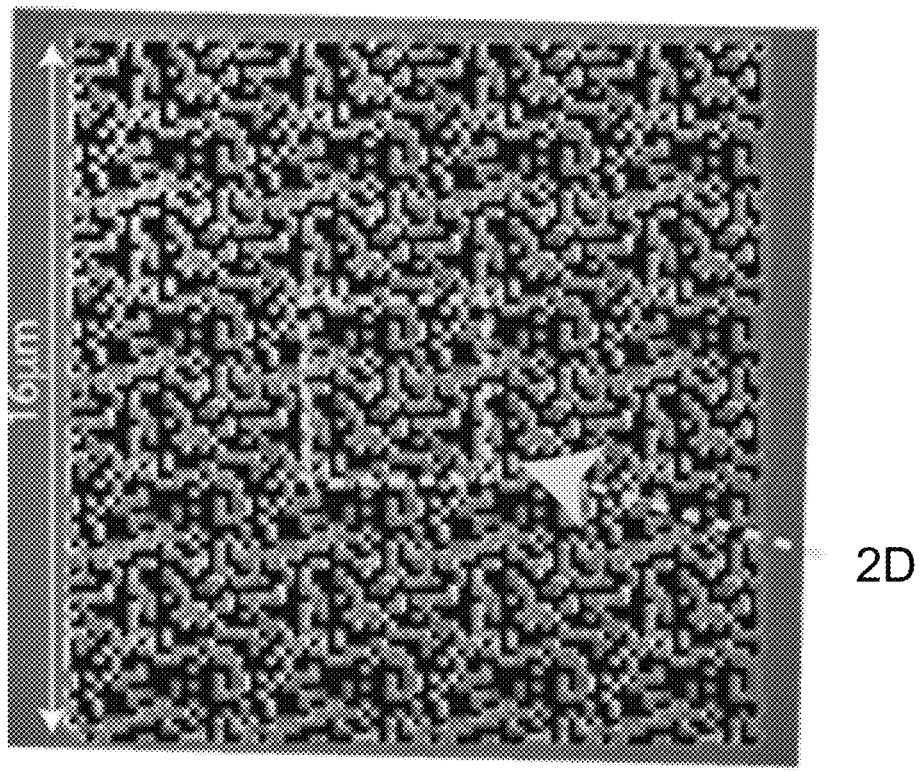
FIG. 2C is a micrograph image of an example of a fabricated metasurface.
Figure 2D:
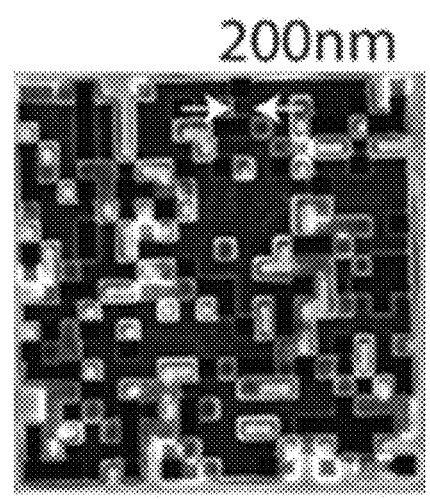
FIG. 2D is a magnified section of the micrograph image of FIG. 2C.
Figure 3A:
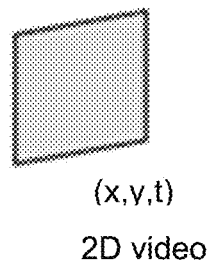
FIG. 3A is a schematic showing a 2D video imaging modality which can be used to capture images consistent with aspects of this disclosure.
Figure 3B:
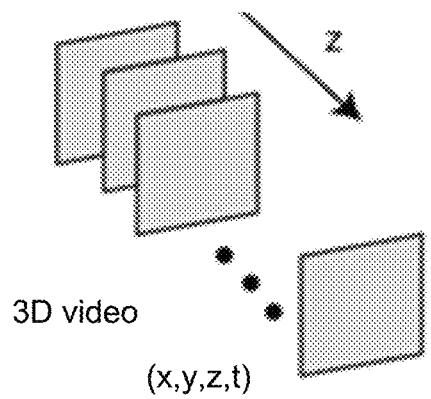
FIG. 3B is a schematic showing a 3D video imaging modality which can be used to capture images consistent with aspects of this disclosure.
Figure 3C:
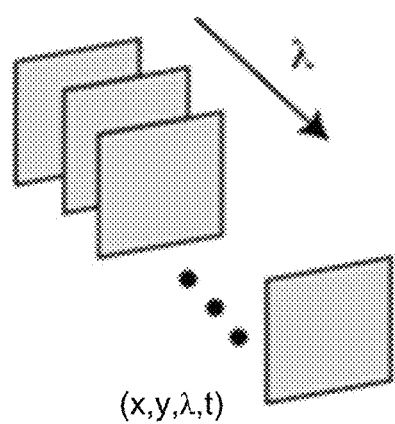
FIG. 3C is a schematic showing a multi-spectral 2D video imaging modality which can be used to capture images consistent with aspects of this disclosure.
Figure 3D:
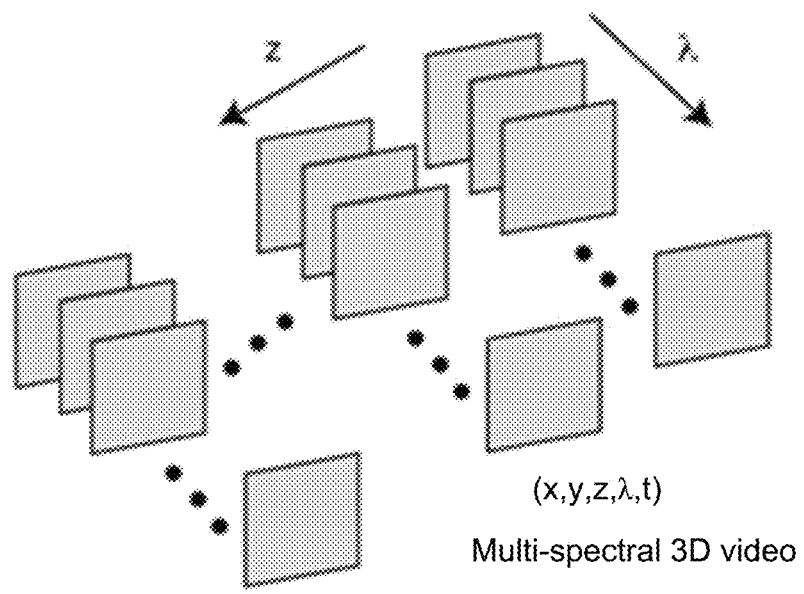
FIG. 3D is a schematic showing a multi-spectral 3D video imaging modality which can be used to capture images consistent with aspects of this disclosure.
Figure 3E:
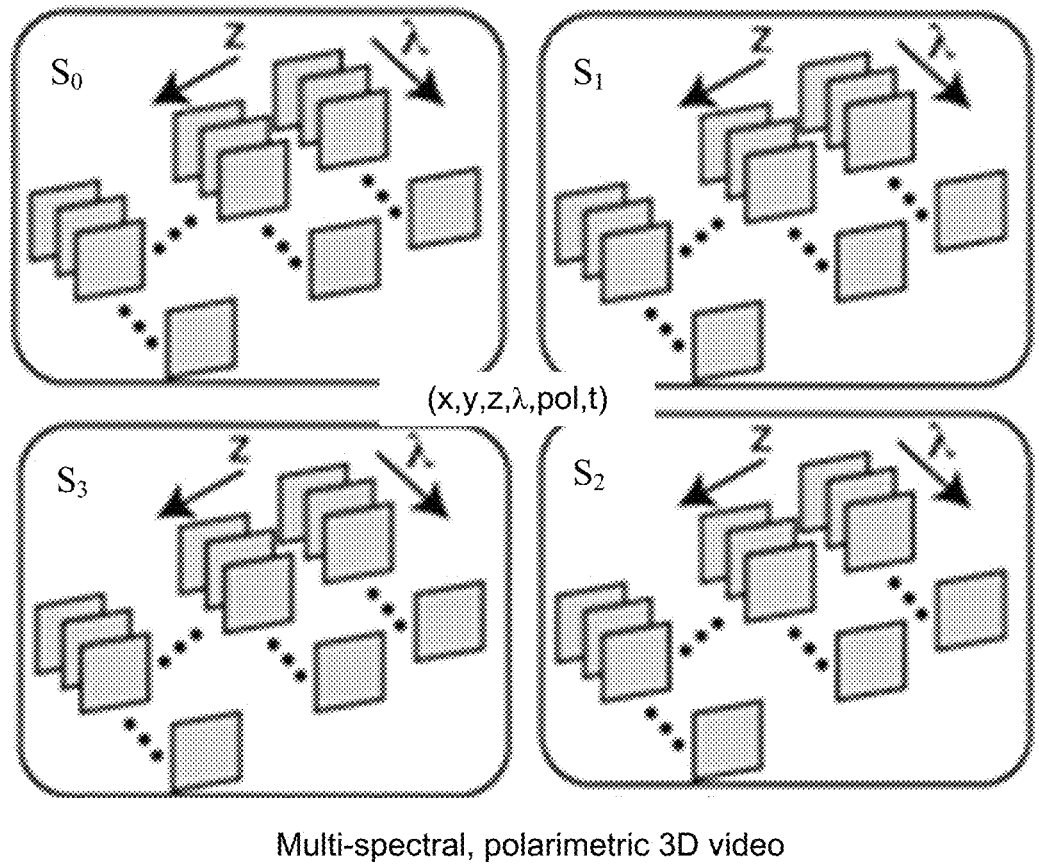
FIG. 3E is a schematic showing a multi-spectral polarimetric 3D video imaging modality which can be used to capture images consistent with aspects of this disclosure.

The metafilter can be fabricated in a low-loss (high-refractive index) dielectric (for visible and NIR wavelengths) such as silicon nitride, amorphous $TiO_2$, or the like. The dispersion of the material can be applied in the full-electromagnetic model. Clearly, this can be a large multi-dimensional topological optimization problem and strategies including adjoint methods and level-set methods can be applied to find globally optimum solutions for the metafilter design. Computational tractability is possible by the use of massively parallel implementation of the finite-difference time-domain methodology for solving Maxwell's equations. An example metamaterial polarizer that was designed using these techniques, and fabricated and characterized is shown in FIG. 2C-D.

This system can provide a new computationally scalable design framework for engineered metamaterials with no loss (all-dielectric) to manipulate both the scalar and vector properties of light. This system can also provide a completely new paradigm in the use of engineered metamaterials, where the unique flexibility of electromagnetic-field manipulation offered by metamaterials is combined with new algorithms for solving inverse problems in multidimensional computational imaging. This method can eliminate many extraneous elements including separate filters, separate beam-paths with associated optics and sensors, etc., which can make the camera significantly more compact, lightweight and cost-effective.

This system can obtain the 8-dimensional field of a scene in a single frame and at the native frame rate of the sensor. Prior art schemes to achieve sub-sets of the 8-dimensional field currently appear to require drastically increased complexity by multiplying the number of beam paths and sensors, by using specific filters that are extremely light inefficient, or by coarse multiplexing schemes employing amplitude masks (coding schemes), which are again very light inefficient. This system can also measure all 6-dimensional lightfield values (x, y, z, $\lambda$, and $\vec{S}$).

One consideration is understanding advantages and disadvantages of diffractive optics (with minimum feature sizes larger than the largest wavelength of interest) and metamaterials (or metasurfaces or metalenses, where the minimum feature sizes are far smaller than the smallest wavelength of interest). Diffractive optics is sufficient to manipulate the scalar properties of light. These include intensity, spectrum, light-field, etc. Furthermore, diffractive optics is considerably simpler to manufacture over large areas cost-effectively using imprint processes due to their much simpler geometries. On the other hand, metamaterials are desirable to manipulate vector properties of light, such as polarization. However, metamaterials are far more challenging to fabricate due to their much smaller features (~$\lambda$/10) and larger aspect ratios (as much as 15:1). The generalization of the laws of reflection and refraction were done over a century ago by diffraction gratings, where light can be redirected in any desired direction by controlling the period. Again, it is important to appreciate that the laws of reflection and refraction describe the intensity of light, a scalar property, and as such metasurfaces are not necessary to generalize them. This is also true for imaging in general as long as only a scalar property of light, typically intensity is measured.

This imaging device can measure not only the scalar properties (x, y, z, $\lambda$, t), but also the full Stokes polarization state (a vector property), such that an engineered metamaterial filter can be used. If one were only measuring scalar quantities, diffractive optics is sufficient and is considerably simpler to fabricate.

The metamaterial filter can be fabricated on top of a conventional CMOS sensor for imaging the full 9-dimensional observable image: 3 dimensions in space, 1 dimension in spectrum, 1 dimension in time and 4 dimensions in polarization state. This can be achieved because the metafilter is an engineered dielectric metamaterial that is engineered in such a fashion as to create distinct patterns of light intensity on the sensor array for different values of this 9D parameter space. A calibration process as described in section 5 can measure these distinct patterns. Subsequently, novel computational techniques can be applied to recreate the full 9D image from the 2D sensor data. Therefore, the concept of engineered metamaterials can enable a highly multi-functional imaging system and in a SWAP factor that is orders of magnitude better than alternatives with far less functionality. The design constraints can be used to optimize the metamaterial filter over all 9D parameters, or only over a subset of these parameters.

Furthermore, this approach can provide a new multi-functional computational camera for 3D multi-spectral polarimetric imaging. Polarimetric imaging can see through strongly scattering media such as fog and smoke. Such capability can be invaluable for the military and first responders. Polarization can enable discrimination based on shape, size, roughness, features, etc. and can be used for target detection and recognition in the battlefield and other regions where direct imaging is obscured. This camera can also be lightweight enough to be placed on drones. Polarimetric imaging can distinguish military targets from the generic background because reflected light from vegetation and other natural background is highly unpolarized compared to artificial targets. Furthermore, polarization can be used to detect edges of objects more accurately. Polarization-enhanced imaging can drastically improve the signal-to-noise ratio when imaging through scattering media like smoke, haze, fog, etc.

Polarization is an intrinsic property of the vectorial electromagnetic field and can be described by the 4 Stokes parameters as follows $\vec{S}=(S_0, S_1, S_2, S_3)^T=(I, Ips_1, Ips_2, Ips_3)^T$, where I is the intensity, p is the degree of polarizability, and $\vec{s}=\hat{s}_1 s_1 + \hat{s}_2 s_2 + \hat{s}_3 s_3$ is the position vector of a point on the unit Poincaré sphere and this point determines the state of polarization of the wave in the most general sense. Note that the components $s_1$ and $s_2$ are the linear polarization states, while $s_3$ is the circular polarization state. In order to measure the full polarization state, the metafilter can be designed with sufficient form birefringence via the nanostructures with the goal of creating near-field intensity distributions that are highly sensitive to the polarization components. This can be accomplished in a polarization sensor (not imager) using a metasurface-based antenna which is inline with a fiber optic. This principle can be extended to full-free space operation as well as to full scene parameters (x, y, z, $\lambda$, t).

A schematic of the achievable imaging modalities is summarized in FIG. 3A-E, where the camera measures intensity in (FIG. 3A) 2D (x, y), (FIG. 3B) in 3D (x, y, z), (FIG. 3C) 2D and spectrum (x, y, $\lambda$), (FIG. 3D) 3D and spectrum (x, y, z, $\lambda$) and eventually, (FIG. 3E) 3D spectrum and polarization state (x, y, z, $\lambda$, S). In each case, the camera captures the associated data in a single frame, which allows for full time resolution (video imaging).

This system can achieve full 9-dimensional imaging of a scene. Sub-dimensions of the scene can be obtained using various methods including time multiplexing, multiple beam paths, focal-plane division, etc. For example, multi-spectral imaging can be obtained using rotating filters (which compromises time resolution) or via spectral filters overlaid over the sensor (which compromises spatial, xy resolution). The same is true for polarimetric imaging as well. When combining polarization and spectral imaging, time resolution suffers due to the need for time-varying filters. 3D imaging is usually obtained via multiple beampaths or via lightfield techniques. Here, all known modalities of a scene can be combined into an ultra-thin engineered metafilter that is placed in the close vicinity of a conventional CMOS sensor (i.e. either directly contacting or within 500 μm, and sometimes from 500 nm to 500 μm).

Figure 4:
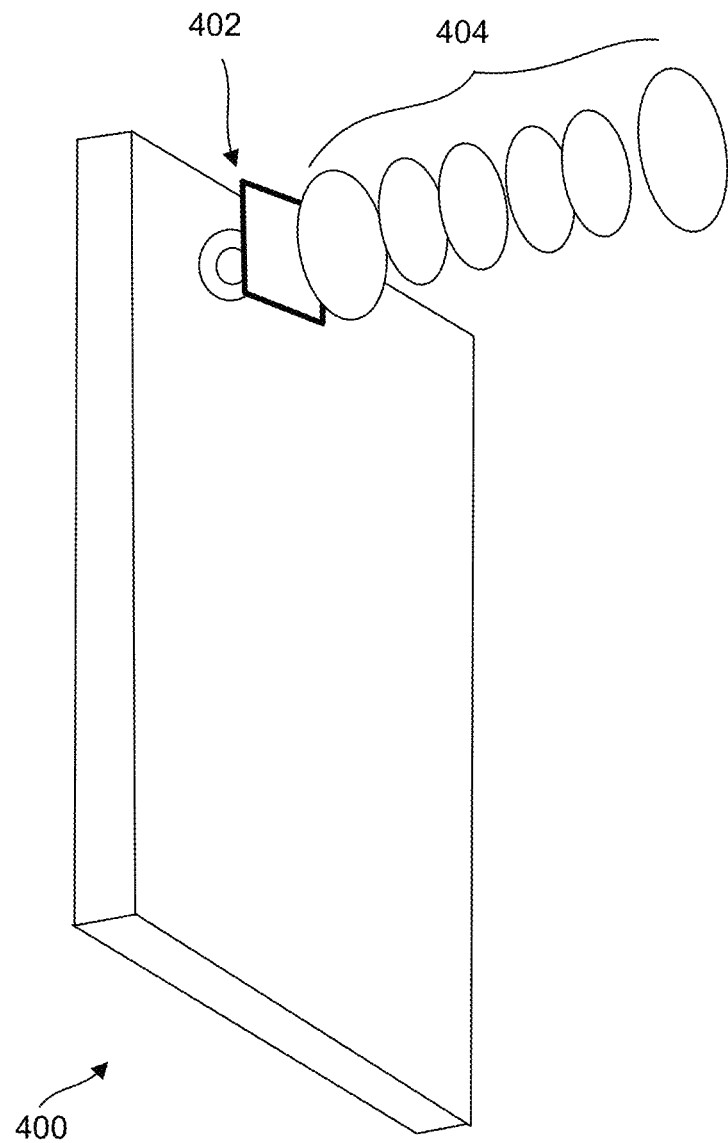
FIG. 4 is an illustration of one example in which the metamaterial filter is oriented in front of an existing camera and having a gap therebetween. As may be appreciated, this approach can provide high spatial resolution in 3D, high spectral resolution, 4 Stokes parameters, high temporal resolution, no change in optics, and can be lightweight for applications such as drones. Such a imaging device can be attached to an existing camera or integrated into conventional camera design.

Furthermore, as generally illustrated in FIG. 4, conventional imaging optics 404 can be used such as those used in mobile-phone 400 cameras. In this example, a metamaterial filter 402 can be introduced in between conventional imaging optics 404 and a CCD sensor.

An iterative pixelated perturbation method (IPPM) can be used to design the metamaterial filter. An initial performance metric can be identified for the metamaterial filter, the metamaterial filter including a substrate. A test cell can be selected from an array of cells on the substrate. The array of cells can include any desired number of cells. For example, the array may comprise a matrix of 1,000×1,000 cells, 25,000×25,000 cells, etc. The size of the array can vary depending on the application and can vary from hundreds across to tens of thousands across, or more. Further, although symmetric arrays are convenient, non-symmetric arrays (i.e. different numbers of x and y cells) can also be optimized using these methods. Note that each cell can also be non-symmetric, i.e., although square cells are illustrated, the cell can be a rectangle, a circle, a ring (in the case of radially symmetric designs) and any other shape that can tile a two-dimensional (2D) surface. Also, rectangles can be used, for instance, in one-dimensional (1D) designs. Each cell can comprise a cell width on the substrate of a few nanometers to tens of nanometers (i.e. 50 to 100 nm). The cells can also be larger or smaller and may be limited simply by the manufacturing method used.

As part of the IPPM, a height of the test cell can be changed by a predetermined height unit. A height unit can be any desired height. For example, a cell height can be increased or decreased by one nanometer, or by ten nanometers, or any other desired increment. Although increments can be varied, as a general guideline the increment can be from about 2-50 nm and in some specific cases may be less than 5 nm. However, increment values larger than 50 nm can be suitable for some applications. Choice of this value can be a function of equipment resolution limitations and design specifications (i.e. a higher target efficiency can benefit from smaller increments). Further, the method can be adjusted to provide a variable increment adjustment from pixel-to-pixel or along a repeated iteration across the array. For example, a first iteration across the array can use a 30 nm increment while a second iteration could use a 10 nm increment.

Images can be computed at a plurality of discrete wavelengths using diffraction-based propagation through the array of cells. This propagation can be done assuming a continuous spectrum. In other words, this method is not restricted to discrete wavelengths. The mathematics will be different for a continuous spectrum as compared with discrete wavelengths but the method is still the same. For example, in the continuous spectrum case, properties of the source can be taken into consideration, such as spatial and temporal coherence. The substrate can be fabricated and tested for each cell change, but this may be time intensive and cost-prohibitive. As a result, a computer, or grid of computers can be used to compute propagation of light or images through the array of cells. In one example, the images propagated through the array of cells can include one or more specific wavelengths of light, or ranges of wavelengths or sets of discrete wavelengths. Use of multiple images can be useful in testing various metrics related to the propagation of light through the array of cells.

In an example including discrete wavelengths, the plurality of discrete wavelengths can span a broadband or narrow band spectral field. For example, narrow band optics can be optimized for specific color ranges, visible light, UV (ultraviolet) light, IR (infrared) light (including near-infrared light), and the like. Furthermore, the metamaterial filter can be broadband.

A wavelength metric can be determined for each of the images propagated through the array of cells. Although spectral efficiency is one useful metric, other metrics can be used alone or in combination with spectral efficiency, such as, but not limited to, image quality, spatial coherence, temporal coherence, and the like. These metrics can optionally be weighted when used in combination.

The wavelength metric(s) for each of the images is consolidated into a perturbed performance metric. The perturbed performance metric is a performance metric which is altered due to the change in height of one or more of the cells, the performance metric being changed as a result of the change in height from an original or previous performance metric to a perturbed performance metric. The perturbed performance metric is compared to the initial performance metric and the method identifies whether the perturbed performance metric is an improvement over the initial performance metric.

The method can further include assigning the initial performance metric the value of the perturbed performance metric when the perturbed performance metric is an improvement over the initial performance metric. The method can further include discarding perturbed performance metric when the perturbed performance metric is not an improvement over the initial performance metric. The method can also further include repeating the method for each cell in the array at least once. Alternatively, the steps of the method can be repeated for only a portion of the cells in the array (i.e. at least 80% or more). In general, enough cells can be optimized to provide for a desired increase or level of optimization of the configuration. In some cases, multiple different random initial guesses can allow for improved results to minimize chances of finding only local maximums of performance. Alternatively, particle swarm optimization and the like can be used.

In further examples, the test cell is selected randomly from the array of cells, or alternately is selected from the array of cells according to a predetermined selection pattern. Changing the height of the first cell by the predetermined height unit can include increasing or decreasing the height by the predetermined height unit. Also, examples of the wavelength metric include propagation efficiency of at least one of the images through the array of cells and image uniformity measured after at least one of the images is propagated through the array of cells. The instant system can acquire the 3D multi-spectral data in only one shot, particularly to avoid motion artifacts.

Example

A conventional camera was converted into a single-shot multi-spectral video imager by inserting a thin micro-filter in the near vicinity of the image sensor. By applying appropriate computational algorithms, multi-spectral video imaging with improved spatial resolution was obtained. The imaging speed is limited by the frame rate of the camera. The current implementation is generalized to use any imaging lens to increase the field of view, is able to achieve high resolution in both spectrum and space, is able to image in both the visible and NIR regimes, perform computational refocusing and computationally trade-off spatial and spectral resolution. Furthermore, experimental and numerical analyses of the noise performance, modulation transfer function and depth of focus of the imaging system is presented.

Figure 5A:
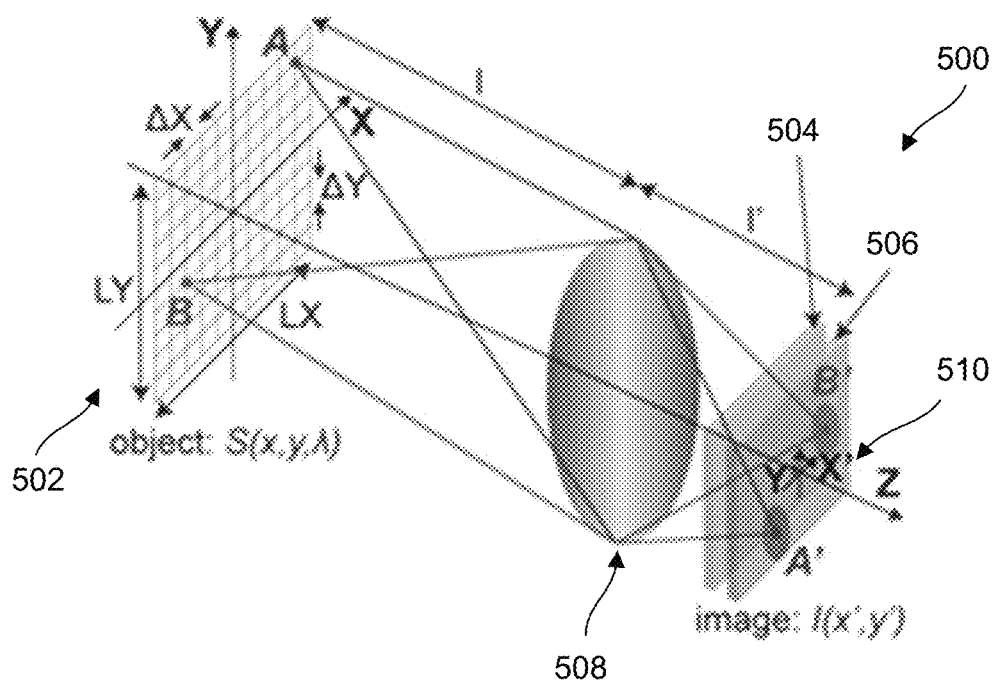
FIGS. 5A-B are schematic illustrations of a single-shot multi-spectral imager. A metamaterial filter is placed in close proximity to the sensor. Due to diffraction through the filter, object points A and B are imaged to diffraction patterns surrounding points A' and B' on the sensor. The diffraction patterns depend on the wavelength and the spatial location of the object point. In this imager, 502 is object S(x, y, λ), 504 is diffractive filter, 506 is sensor, 508 is lens image I(x', y'). 510 is a substrate, and 512 is a sensor array. Note that measurements are exemplary and not limiting.

An imager 500 is schematically described in FIG. 5A. In a conventional imaging system under geometrical optics, the lens 508 images single points (A & B) in the object plane (XY) 502 onto single points (A' & B') in the image plane (X'Y') 510 at the sensor 506. A thin diffractive filter (DF) 504 was inserted in front of the image plane 510. Therefore, before converging to points A' and B', light is diffracted by the diffractive filter 504. The diffraction patterns received by the sensor 506, represented by the A' and B' circles in FIG. 5A, are wavelength-dependent. The diffraction patterns also vary according to different spatial locations of their original points in the object plane 502 (A & B). The centers of the diffraction patterns, circles, still coincide with the points A' and B'. Therefore, one wavelength at one object point uniquely corresponds to one diffraction pattern in the sensor plane 510.

According to the description above, the intensity distribution of the recorded image is basically a linear combination of the diffraction patterns of all the wavelengths at all the spatial points that contribute to the image. This can be expressed as a matrix multiplication: I=AS, where $S(x, y, \lambda)$ is the unknown 3D multi-spectral data cube, $I(x', y')$ is the intensity distribution of the 2D image on the sensor and $A(x', y'; x, y, \lambda)$ is the 5D matrix representing the response due to the filter. In a preliminary implementation, the object plane 502 was discretized to 30 by 30 points, spaced by $\Delta X=\Delta Y=120$ μm (grid in FIG. 5A). At each point, 25 wavelengths were computed between 430 nm and 718 nm in steps of 12 nm. To experimentally calibrate the matrix A, a pinhole was mounted on a 2D motorized stage to scan across the object grid and the pinhole was illuminated by a super-continuum source equipped with a tunable bandpass filter that selects the wavelengths. Retrieving S from A and I is a typical inverse problem ($S=A^{-1}I$) that can be readily solved via Tikhonov regularization, or similar regularizers. Iterative algorithms are slow to converge and thus are not used here, but may be used if speed is not an issue. Note that each frame is sufficient to obtain the multi-spectral data for that frame and by piecing together multiple frames, multi-spectral video can be readily generated. The regularization parameter is independent of the scene details and is the same for all frames. Video imaging is identical to single-frame imaging as long as the computation can be performed at the video rate.

Figure 5B:
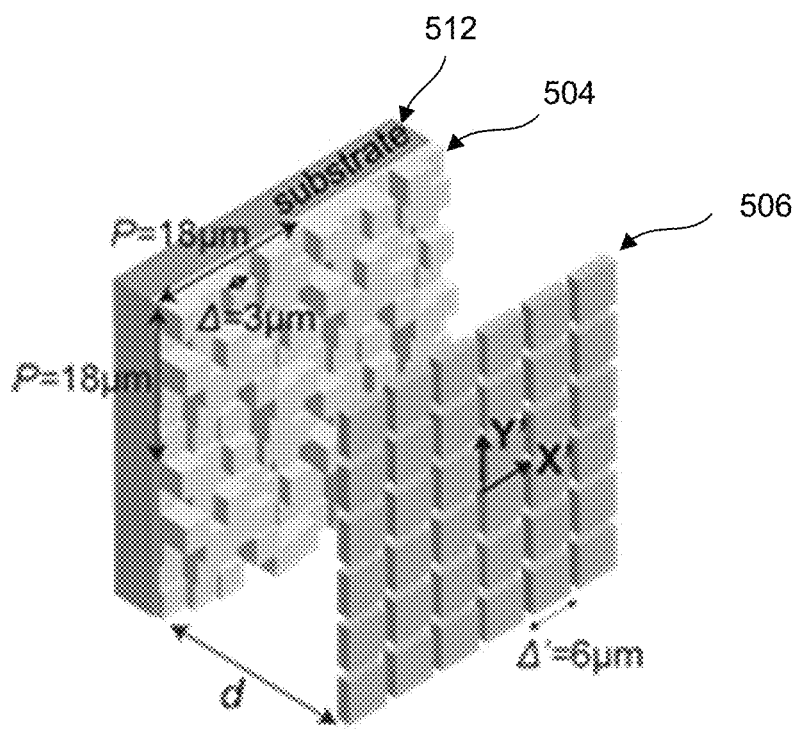
Figure 5C:
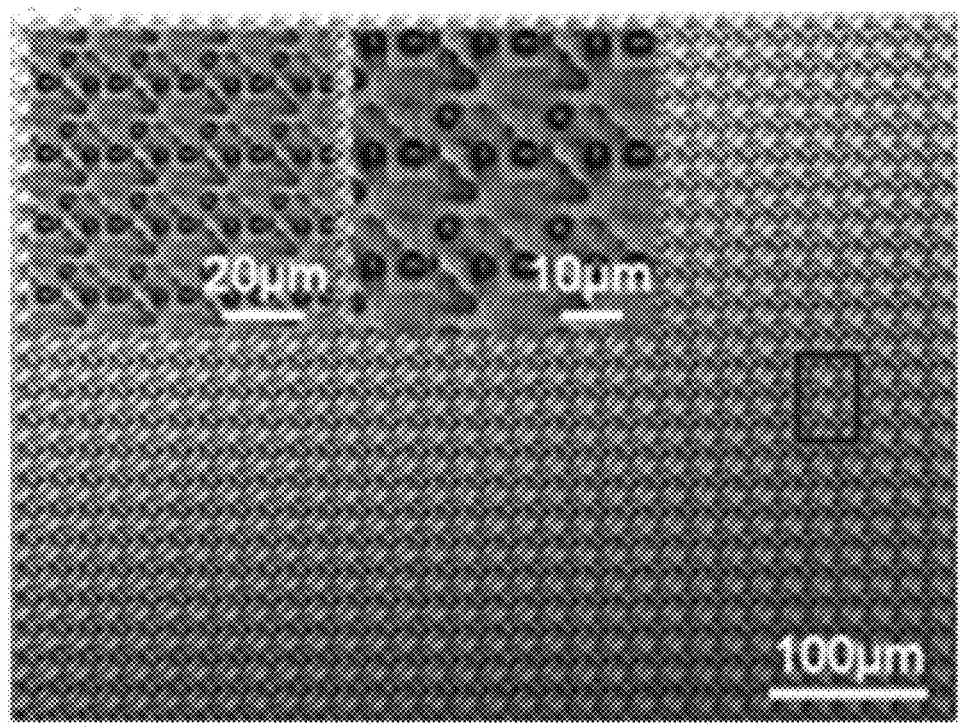
FIG. 5C is a micrograph of the fabricated metamaterial filter. Oblique illumination is applied to enhance contrast (insets: images with larger magnifications).
Figure 5D:
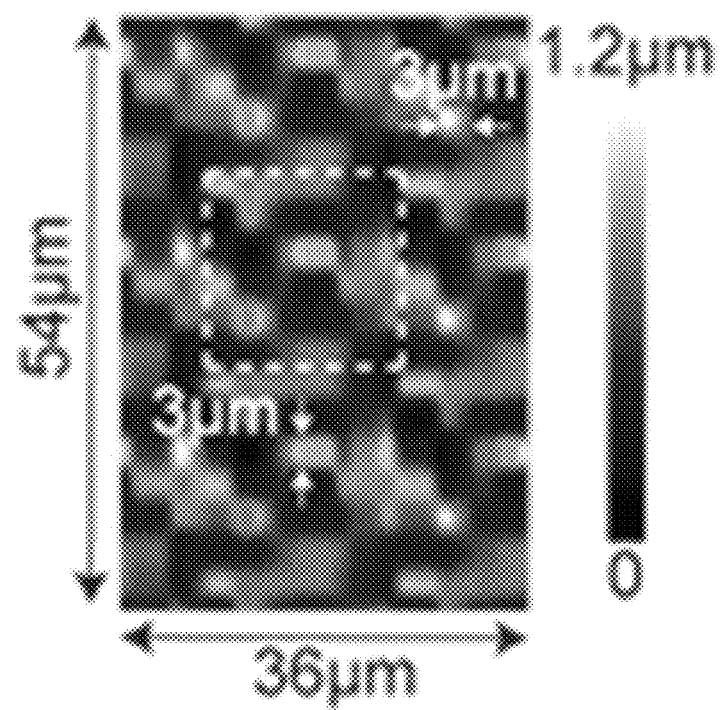
FIG. 5D is an atomic-force measurement of the DF delimited by the black box in FIG. 5C. In this example, the structure has maximum height of 1.2 μm and a pixel size of 3 μm is labeled and one period is enclosed by the white dashed box.

A schematic of the diffractive filter 504 is depicted in FIG. 5B. This example is a 2D multi-level structure comprised of a super-lattice of period P=18 μm and constituent square pixel of size, $\Delta=3$ μm. Each pixel is quantized into various height levels and the maximum height is set to 1.2 μm for ease of fabrication. Note that periodicity is not necessary in this application. The gap, d between the DF 504 and the sensor 506 is approximately 0.5 mm. As a general guideline, gaps from 500 nm to 500 μm can be used, while larger gaps allow improved discrimination between frequencies, spatial resolution becomes more challenging with increased gap distances. In this example, a monochrome CMOS sensor (DMM22BUC03-ML, The Imaging Source) with sensor-pixel size=6 μm was used. The DF is patterned in a transparent dielectric material (Shipley 1813 photoresist) coated on fused silica substrate 512 via gray-scale lithography (see FIG. 5C). FIG. 5C provides optical micrographs of the DF at three magnifications (VHX-5000, Keyence). The shadows in the images are created by oblique illumination to emphasize the three-dimensional profile. An atomic force microscopy (AFM) image is shown in FIG. 5D, where the white dashed square encloses one period and the 3 μm features are clearly marked. A commercial lens (MVL12WA, Thorlabs, resolution of ~600 cycles/mm) is placed in front of the DF.

Figure 6A:
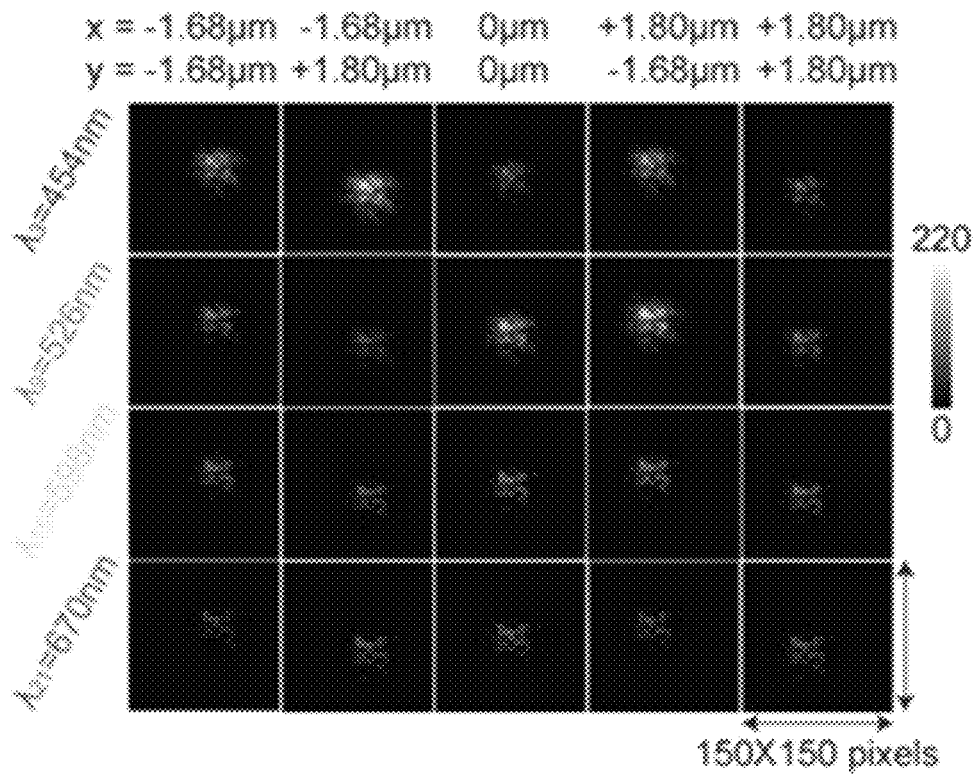
FIG. 6A shows exemplary measured data for A(x', y'; x, y, λ) at five spatial locations and four wavelengths. Each frame has 150 by 150 pixels.

The first step was to measure the matrix A. This was achieved via a calibration setup. A super-continuum source (EXW6, NKT Photonics) was collimated and expanded, then illuminated the pinhole (diameter, $\varphi=150$ μm). In order to ensure that the illumination overfills the aperture of the lens, the pinhole was mounted at the focus of an achromatic lens and a diffuser was glued to its back. The lens magnification was ~24 and the image of the pinhole was smaller than the diffraction-limited spot-size. The pinhole was stepped along the object grid (FIG. 5A) using a 2D stage (Z825B, Thorlabs). A tunable bandpass filter (VARIA, NKT Photonics) was used to select the wavelength for illumination. A bandwidth of 12 nm was utilized for these experiments. Exemplary measured values of $A(x', y'; x, y, \lambda)$ are plotted in FIG. 6A at five different object point locations (x, y) and four different wavelengths ($\lambda$). Note that this calibration only needs to be carried out once and the data can be used for all frame reconstructions. As mentioned earlier, the data cube S has a dimension of 30×30×25=22500. In order to solve the inverse easily, A is defined as a square matrix and thus the raw image I has a dimension of 150×150 pixels. These images are cropped from the original camera images. From FIG. 6A, it is clear that the diffraction patterns changes with both wavelength and location. In other words, the point-spread function is both spatially and spectrally variant.

Figure 6B:
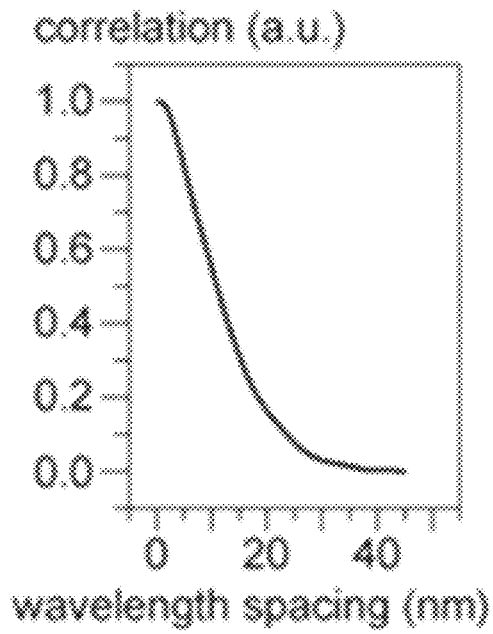
FIG. 6B is a graph of spectral correlation functions versus wavelength spacing for the example of FIG. 6A.
Figure 6C:
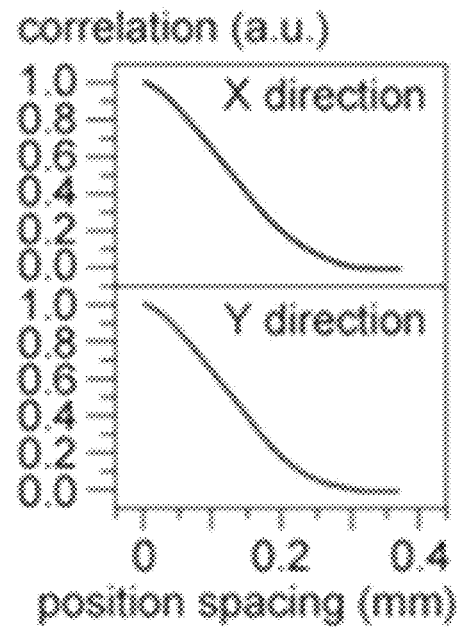
FIG. 6C is are graphs of spatial correlation functions versus position spacing (top panel: X direction; bottom panel: Y direction) for the example of FIG. 6A.

As in computational spectroscopy, the spatial and spectral resolutions can be estimated via the cross-correlation between the diffraction patterns at the object coordinates, (x, y, $\lambda$). FIGS. 6B and 6C plot the spectral and spatial cross-correlation functions of the constructed imaging system versus the sampling in the wavelength and spatial domains. This analysis of resolution is clearly independent of the specific reconstruction algorithm or regularization parameter, and hence, is a fundamental metric of this particular camera. Here a finer wavelength scan step of 1 nm was used to obtain a smooth curve and the calculated spectral resolution, defined as the wavelength spacing when cross-correlation equals 0.5, is ~9.6 nm. Note that this spectral resolution is slightly smaller than the spectral sampling size, 12 nm during calibration. The plot in FIG. 6B is averaged over all spatial positions. The spectral resolution remains the same over the entire calibration space. Similarly, a finer scan step of 10 μm in space was used to compute the spatial cross-correlation, plotted in FIG. 6C. A spatial resolution of ~120 μm is estimated in both orthogonal directions (X and Y) when cross-correlation is equal to 0.5. Again, FIG. 6C was averaged over all wavelengths a detailed analysis shows that the spatial resolution is higher in the blue and green wavelengths than that in the red. These values from FIGS. 6B and 6C are only upper bounds in resolution inherent to the current system, since the final resolutions are also determined by the sampling (step) size during calibration. Intuitively speaking, larger step sizes in the wavelength and spatial domains lead to poorer spectral and spatial resolution, respectively. Since the imaging lens provides a demagnification factor of 24×, the spatial resolution determined by the sensor-pixel size of 6 μm is 6 μm×24=144 μm. The simulated spectral and spatial resolutions are somewhat smaller than expected values. This is due to the fact that the image reconstruction is analogous to fitting to a structured PSF, which can be theoretically shown to have a lower Cramer-Rao lower bound and thereby, attain higher resolution. A similar principle operates in both the spectral and spatial domains. Note that both resolutions can be tuned by either changing the pinhole diameter in calibration or adjusting the gap between the DF and the sensor. In addition, a computational trade-off can be made between spatial resolution and spectral resolution, and vice-versa without any change in the hardware.

For all the following imaging experiments, the spatial sampling in the object plane was 120 μm during calibration. Various color images were displayed on the LCD screen of an iPhone 6 placed in the object plane. The raw monochrome data, $I(x', y')$ are captured at such exposure times, which ensure that the sensor pixels are not saturated. A second optical path captured reference RGB images using the same lens and the same sensor chip, but with the conventional Bayer filter (DFM22BUC03-ML, The Imaging Source). Multi-spectral images were reconstructed as described earlier. Color (RGB) images were computed from the multi-spectral data for comparison to the reference images, using standard transmission functions for the Bayer-filter array.

Figure 7A:
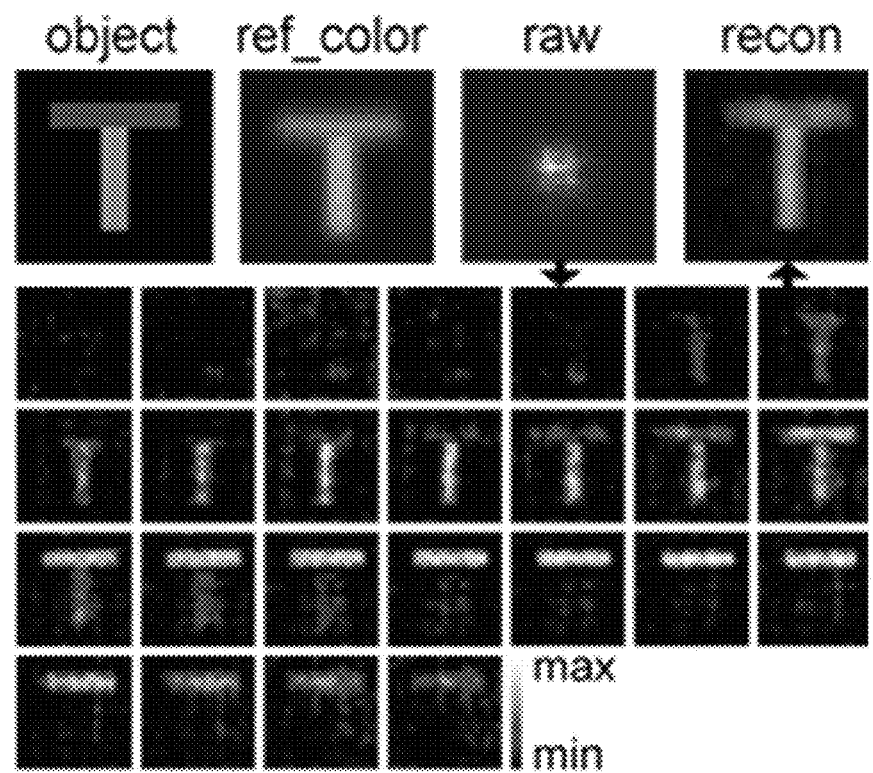
FIGS. 7A-F present panels showing experimental results of the multi-spectral frames and color images using regularization based on the raw images and the calibrated PSFs. The designed object patterns to be displayed, the reference RGB images (3.6 mm by 3.6 mm field-of-view, 25×25 pixels), the raw monochrome images (150 by 150 sensor pixels) and the reconstructed RGB images (3.6 mm by 3.6 mm field-of-view) of the test patterns are shown as the top row. The normalized multi-spectral frames (3.6 mm by 3.6 mm field-of-view) are plotted in the bottom four rows. Six object patterns are tested.
Figure 7B:
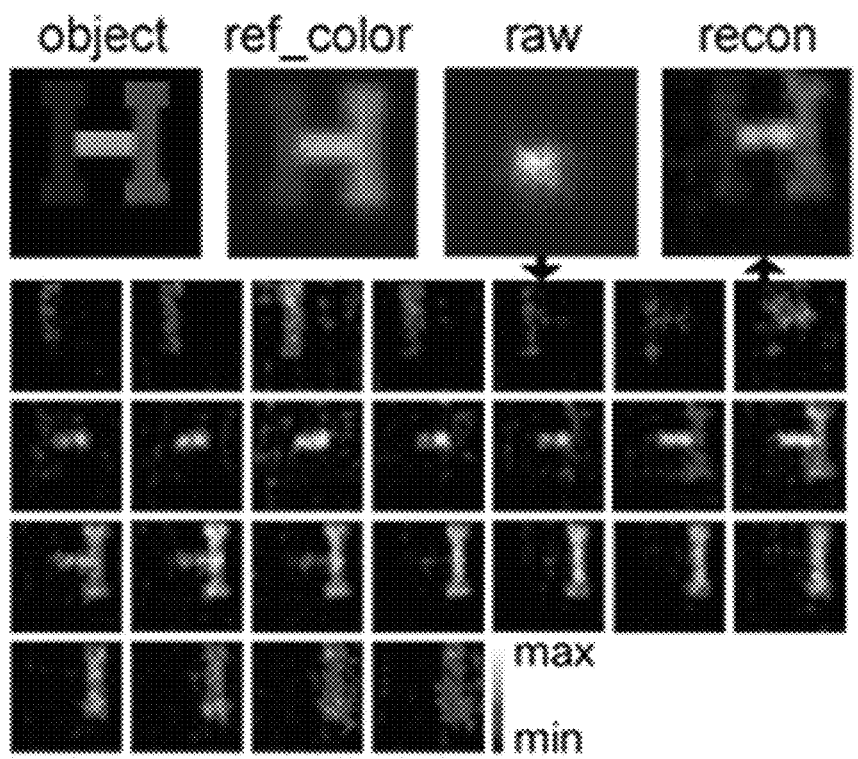
Figure 7C:
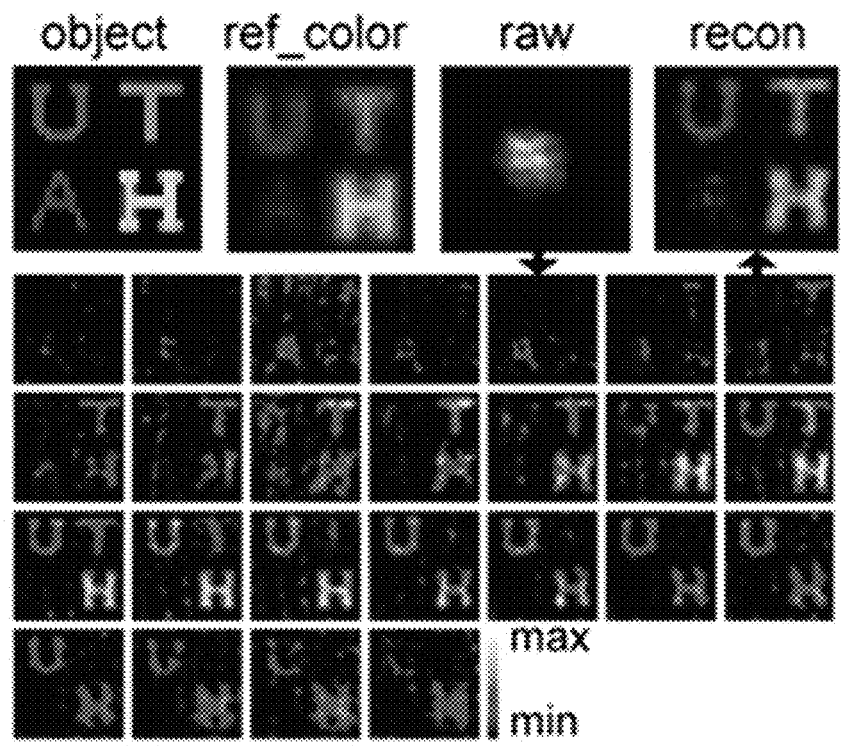
Figure 7D:
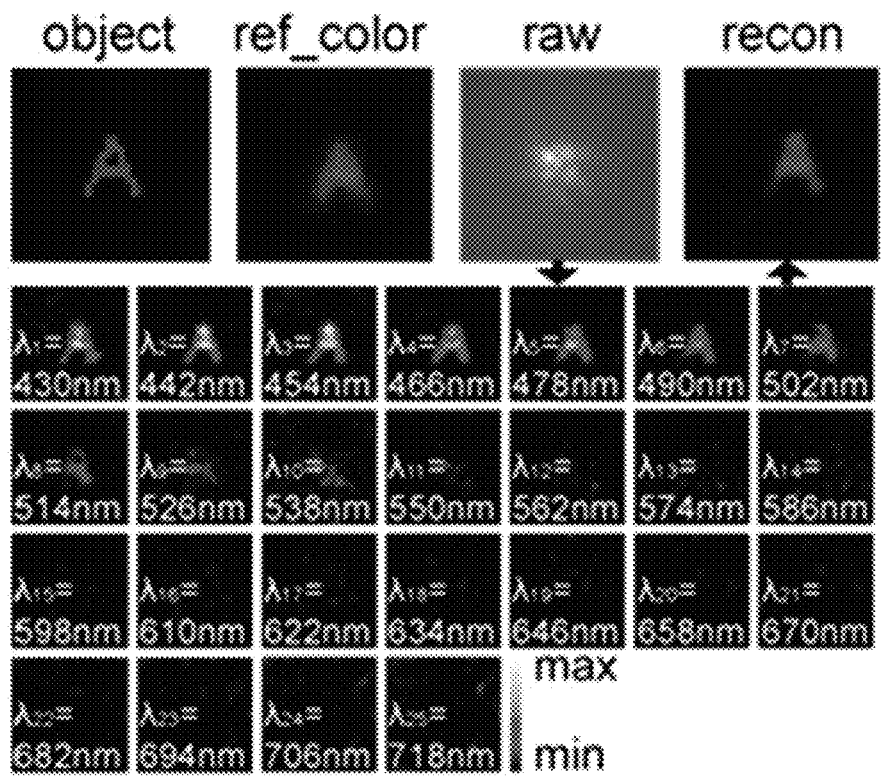
Figures 7E, 7F:
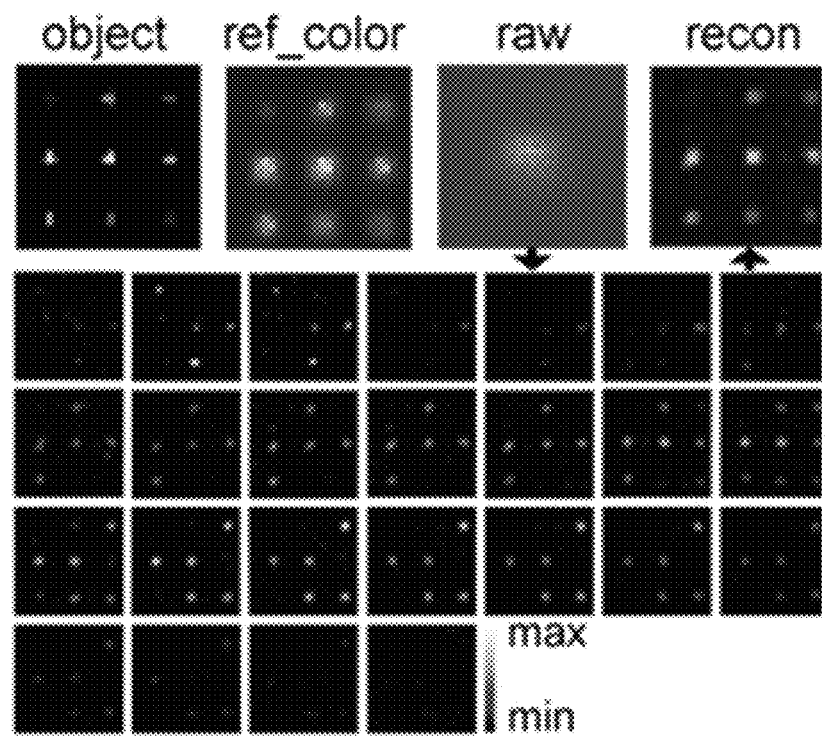
Figure 8A:
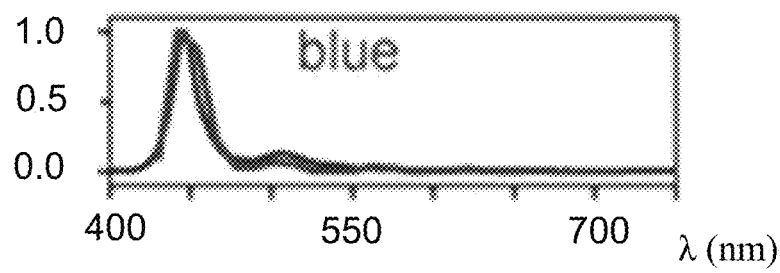
FIGS. 8A-G are normalized spectra at the centers of the dots of different colors in FIG. 5E. The reference spectra measured by a commercial spectrometer are plotted in black solid lines. The spectra are of (FIG. 8A) blue.
Figure 8B:
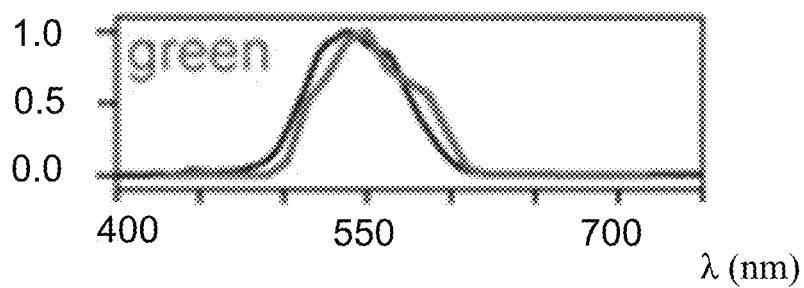
Figure 8C:
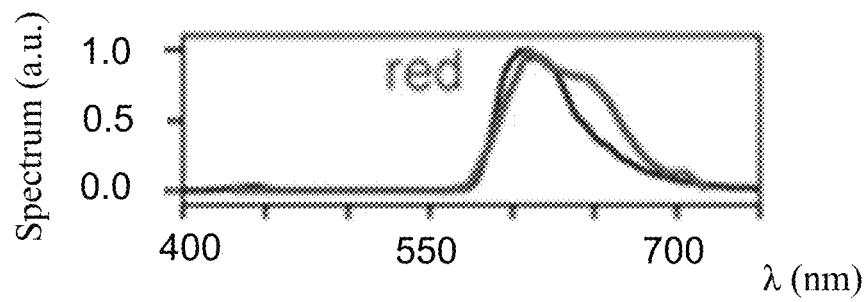
Figure 8D:
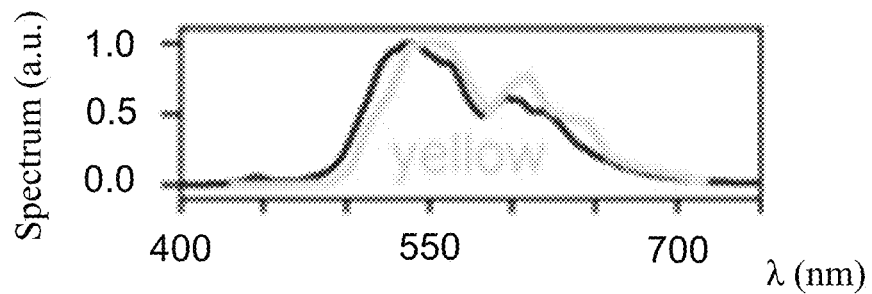
Figure 8E:
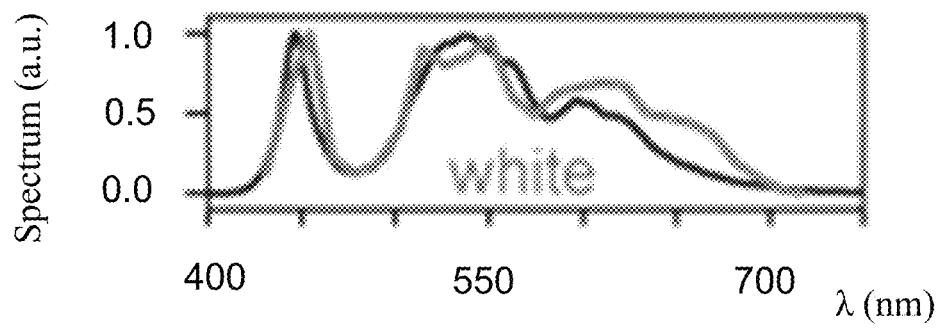
Figure 8F:
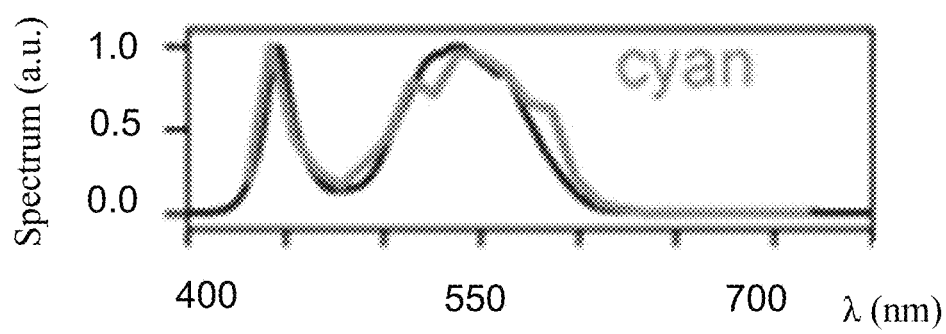
Figure 8G:
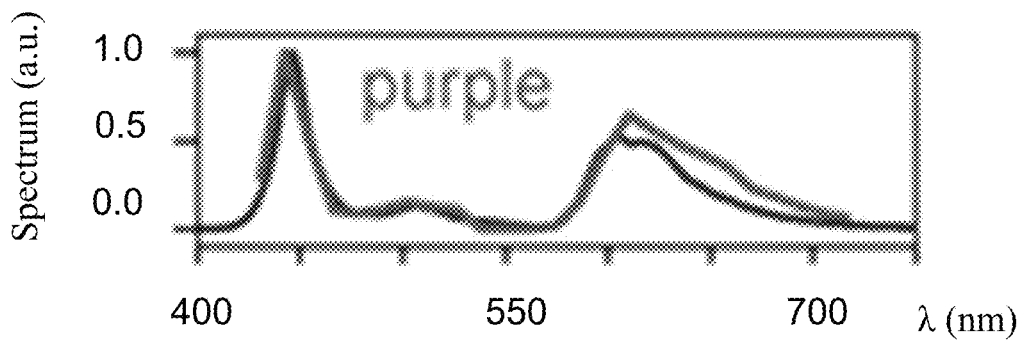

The results of six different objects are summarized in FIGS. 7A-7F. The multi-spectral data has 25 wavelengths, ranging from 430 nm to 718 nm separated by 12 nm and arranged into four rows, roughly corresponding to blue, green, red and near-infrared channels from top to bottom. The first example is a 2-color letter 'T'. According to the multi-spectral images in FIG. 7A, the vertical green bar contains signals from $\lambda$=514 nm to 598 nm, while the top red bar contains signals from $\lambda$=586 nm to 682 nm. In the multi-spectral plots of FIG. 7B, the first, the second and the third rows contain blue, green and red spectra of the left, the center and the right parts of the letter 'H', respectively. The plots of near-infrared in the fourth row are blurred and noisy due to low signal of the object (iPhone screen) at those wavelengths. FIG. 7C is an object of four letters 'U' 'T' 'A' and 'H' of four different colors. The yellow 'H' doesn't come out accurately due to inappropriate white balancing in this demonstration. The letter 'A' in blue channel is not reconstructed properly, compared to the letters of other colors, primarily due to the brightness difference between the 3 RGB color channels in the source (iPhone screen). FIG. 7D illustrates excellent reconstruction of a single letter 'A' that consists of only one blue color. This indicates that applying high-dynamic range algorithms and hardware can significantly improve the image quality. The nine-dot-array in FIG. 7E has more colors. The center white dot has signals contributed from all the wavelengths except the near-infrared row. The left middle yellow dot contains green and red spectra. The bottom purple dot has blue and red channels but leaves the green channel blank. Blue and green spectra contribute to the cyan dot at the right middle. The reconstructed spectra at the centers of the dots (normalized to its maximum) are plotted in FIG. 8A-G. They match well with the reference spectra measured by a commercial spectrometer (Ocean Optics Jaz) in black lines. The average error is less than 8%. The multi-spectral images of a rainbow are shown in FIG. 7F. The peak wavelength is red-shifted from left to right as expected.

These reconstructed images also suggest that better spatial resolution than the reference color camera can be obtained. The shapes of the reconstructed color patterns are clearer and narrower than those of the reference. Extra noise in the reconstructed images are ascribed to mechanical alignment errors, sensor noise in both calibration and raw images, and inherent numerical errors of the regularization algorithm. The average cross-talk between neighboring spectral channels was experimentally confirmed at about −5 dB and the spectral cross-talk between channels that are not neighbors is smaller than −10 dB. Currently, it takes ~0.08 sec to complete one frame reconstruction using regularization in MATLAB, running on a laptop computer (Quad Intel i7 Core, 16 GB RAM). Note that an optimal regularization parameter of $\omega$=3.0 is used in all reconstructions. Further optimization of the reconstruction algorithm and hardware implementation can speed this up significantly.

To illustrate multi-spectral video-imaging, this camera was used to capture a test video of a rotating three-color letter 'H', displayed on the iPhone screen as before. The frame rate was 15 fps. The sensor data was processed and reconstructed in real-time. As expected, the reconstructed RGB video matches the original RGB video on iPhone screen quite well. Note that the computational part of the video imaging is identical to that for still imaging, just repeated over multiple frames.

Figure 9A:
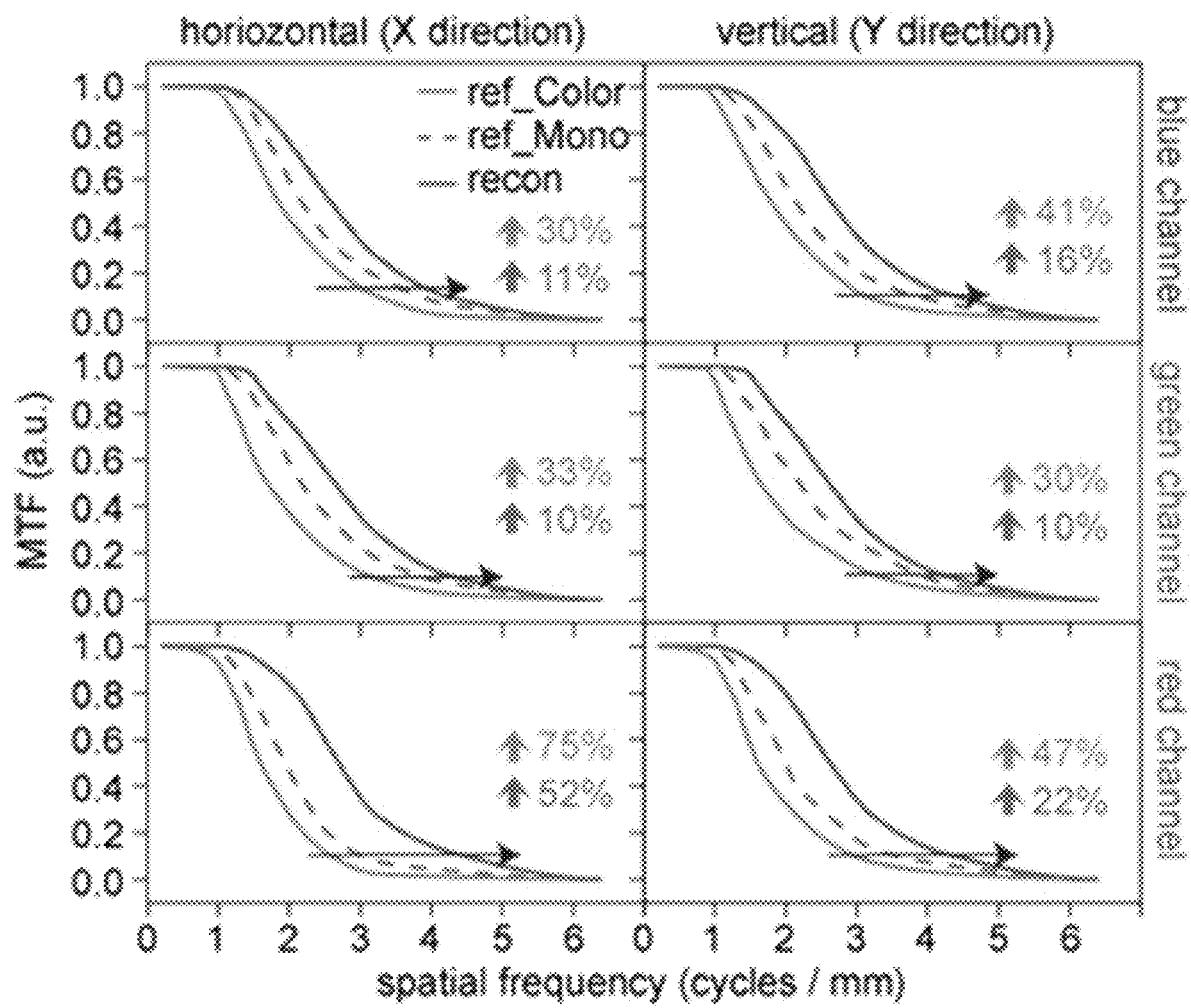
FIG. 9A is Measured Modulation Transfer Functions (MTFs) in X and Y axes and three primary color channels.
Figure 9B:
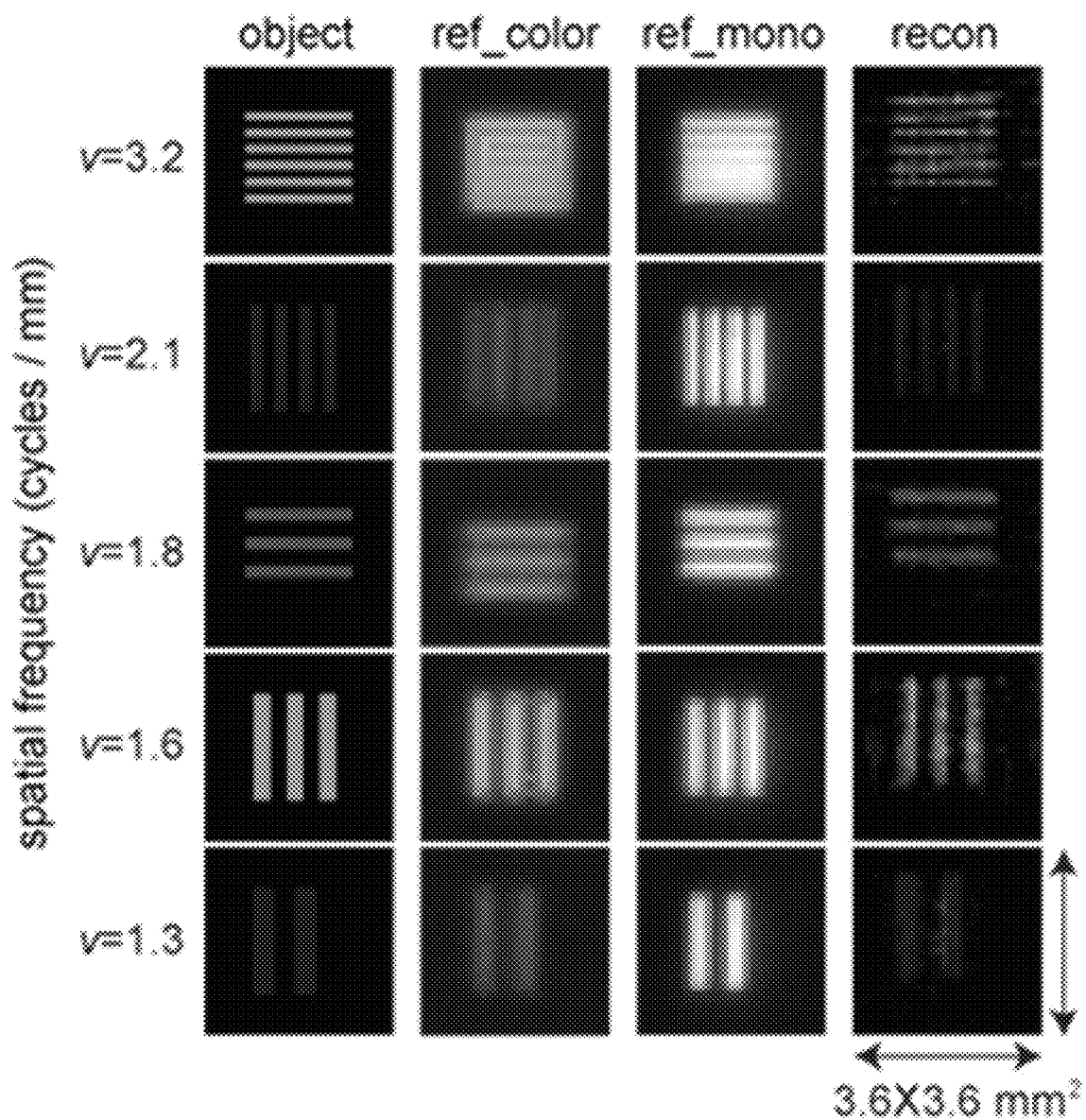
FIG. 9B illustrates exemplary test object patterns at five spatial frequencies, their reference images using color and monochrome cameras and the reconstruction results.

To quantify the spatial resolution of this system, the modulation transfer function (MTF) of the camera was measured. The object was comprised of periodic lines of the same color. Since the iPhone 6 screen has resolution of 326 ppi (78 µm pixel pitch), the minimum period of the test pattern was 2×78 µm=156 µm (or the maximum spatial frequency, v=6.4 cycles/mm). The measured MTFs along the X and Y axes, and for the 3 basic colors (blue, green and red) are plotted in FIG. 9A. From the measured data, it is observed that the spatial resolution (defined as the line-spacing where MTF=0.1) is increased by 43% and 20% along the X and Y axes, respectively, averaged over the 3 colors, when compared to that obtained using the conventional Bayer filter in the reference camera. This is in stark contrast to conventional multi-spectral imagers, where spatial and spectral resolution are traded off against one another. FIG. 9B shows some exemplary MTF test patterns and images at five different spatial frequencies and various colors. The reconstructed images have higher contrast when compared to the reference images. Although our default data type is the multi-spectral image, in FIG. 9B, only the reconstructed RGB color images are shown for simplicity. As mentioned earlier, the increase in spatial resolution can be attributed to the use of structured PSFs. The iPhone 6 screen used in the experiment is 326 ppi with a pixel size of 78 um. This is much smaller than the resolution of the camera, 4.2 cycles/mm and the reconstruction grid, 120 um.

Computational trade-off spectral and spatial resolutions was also made without changing the hardware. To illustrate this, using the same camera, reconstructed images of size 50×50 pixels for 9 spectral bands were obtained with the same camera above. Thus, our computational approach allows for great flexibility in the selection of resolution in spectrum and space.

Figure 9C:
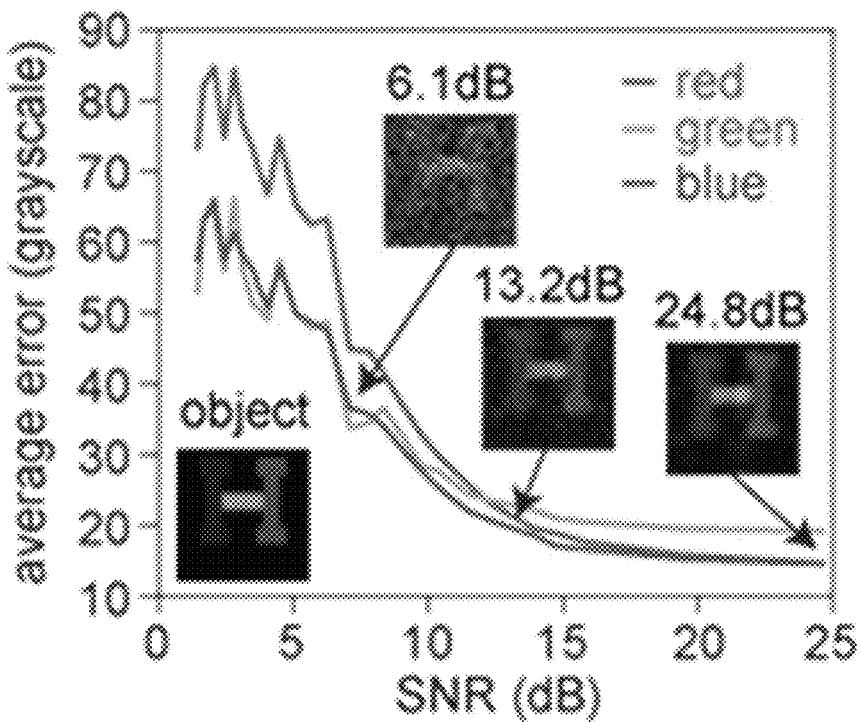
FIG. 9C is a graph of averaged image reconstruction error versus signal-to-noise ratio (SNR) in three basic color channels. Gaussian noise is added to the numerically synthesized sensor image to change the SNR.

Since the camera is based upon computational reconstruction, noise introduced in the reconstruction process can be clarified. The impact of noise was determined by performing careful simulations, the results of which are summarized in FIG. 9C. Specifically, random noise (from a Gaussian distribution) of different standard deviations was manually added to a numerically synthesized sensor image, I(x', y'), which was generated using the calibrated PSFs, A and the multi-spectral object, S(x, y, $\lambda$) via I=AS. The system was then inverted to compute the multi-spectral image using regularization as before. The multi-spectral image was then converted to the RGB color image. Finally, the error between the reconstructed color image and the object in three-color channels, averaged over the entire image, was computed. Based on the curve of error versus signal-to-noise ratio (SNR), an SNR tolerance threshold of −13 dB (or equivalently 12 grayscale values for an 8-bit sensor) was estimated. Here, SNR is defined as 10 times the logarithm of the ratio of the average signal intensity over the standard deviation of the Gaussian noise. A detailed experimental analysis shows that the camera has SNR on par with that of the reference camera under high-light conditions (>500 lux). It experiences only a <0.4 dB SNR reduction when the illumination brightness is dimmed to 80 lux. The noise performance at low-light conditions may be further improved by optimizing the design of the filter to reduce the spatial spread of the diffracted light.

Figure 9D:
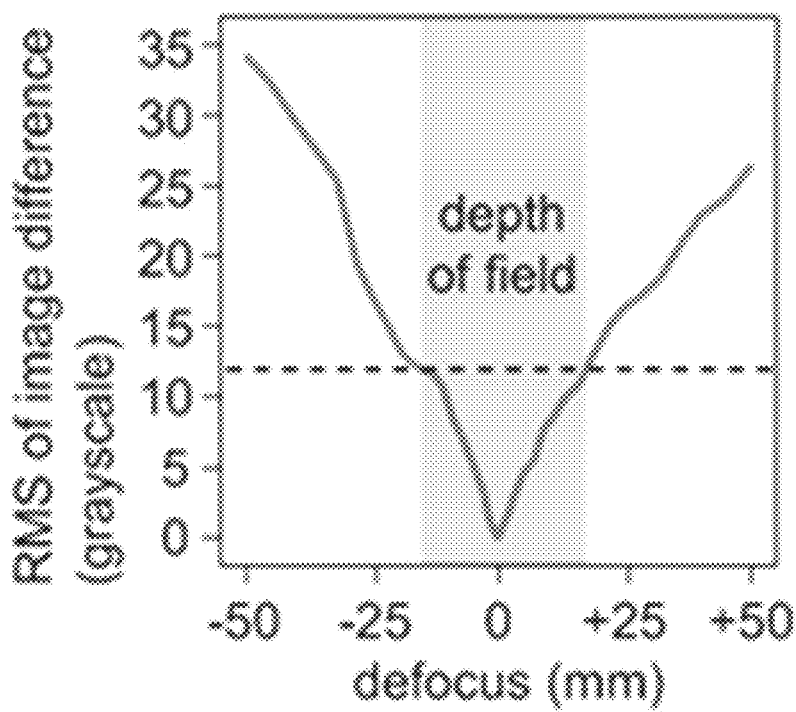
FIG. 9D is a graph of root mean squares (RMSs) of differences between the PSF images with and without defocus. A depth-of-field is estimated (light green region).

Depth-of-field (DOF) is another important specification of any camera. To experimentally measure the DOF, the multi-spectral PSFs were first captured at various planes of the object (the pinhole) corresponding to various values of defocus. Then, the root-mean-squares (RMS) of the differences between the PSF images at a given defocus and those at focus were computed (see FIG. 9D). As expected, the RMS increases with larger defocus and a DOF of ±15 mm is predicted according to the 13 dB threshold (or 12 gray-scale, see FIG. 9C), which is slightly larger than the ±10 mm DOF of the reference camera with the same parameters. The plot in FIG. 9D is averaged over all the wavelengths. The DOF is shorter in the green and yellow wavelengths compared to that in the blue and red wavelengths.

Figure 9E:
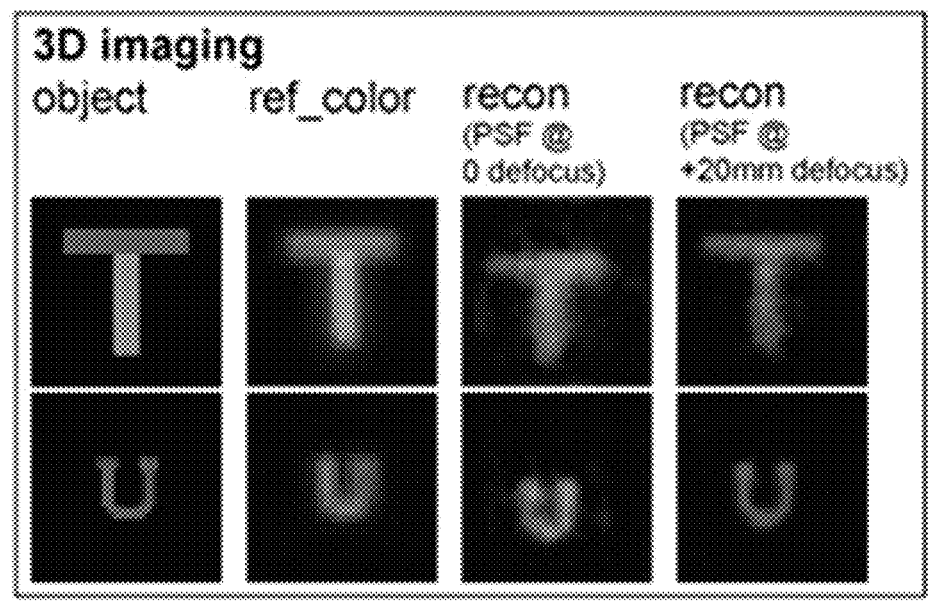
FIG. 9E illustrates two examples for 3D imaging experiments: the 2-color letter 'T' and the 1-color letter 'U'.

An important feature of the camera is the possibility of computational refocusing and extension to 3D multi-spectral imaging. A simple demonstration is given in FIG. 9E. The multi-spectral PSFs was measured at various planes that were displaced from the in-focus object plane, similar to the DOF experiment performed above. Then, a multi-spectral object was imaged at a plane shifted by 20 mm from the in-focus object plane. As expected, the multi-spectral image computed using in-focus PSF data is distorted with significant color errors and noise. However, the correct multi-spectral image can be computationally obtained by simply using the PSF data calibrated from the correct defocus plane (+20 mm). This points to the possibility of generating 3D multi-spectral images by calibrating the multi-spectral PSF data over the 3D space. However, the caveat is that this requires a lot more data as well as more computation.

Figure 9F:
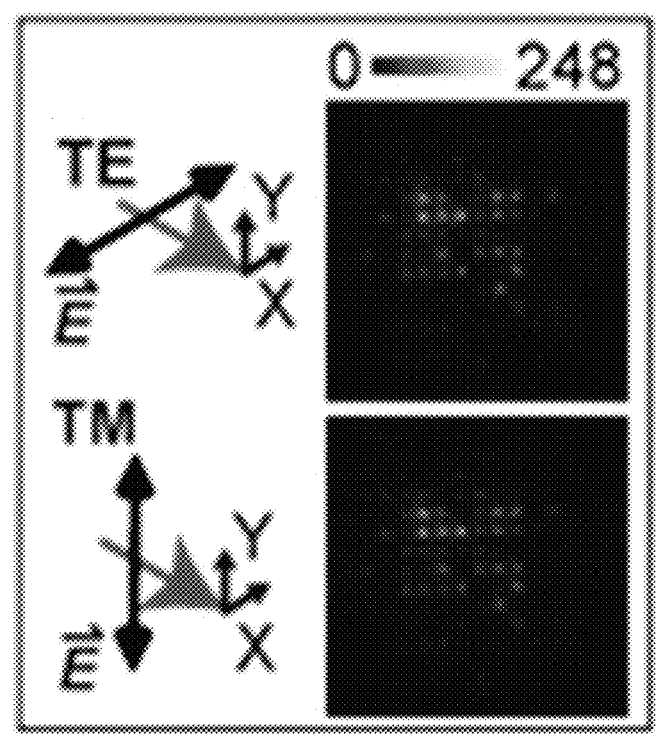
FIG. 9F show magnified views of the experimentally calibrated PSFs illuminated by two polarization states. TE and TM polarizations are defined on the left side. They are of the same object point and the same wavelength. They are both 70 by 70 sensor pixels.

For a general imaging system, it is important that the diffractive filter is polarization insensitive. Many alternative color filters such as those using plasmonics suffer from a major disadvantage of being polarization sensitive. To illustrate this advantage of the present technique, the PSF was experimentally captured at two orthogonal polarizations (TE and TM) and verified that they are indeed identical. The magnified views of two diffraction patterns of the same multi-spectral object point (x=0, y=0, λ=550 nm) are shown in FIG. 9F. Note that even though we utilized randomly polarized light in all our calibration, the light from the iPhone screen is nearly linearly polarized. This further proves that this camera is polarization-independent.

Figure 9G:
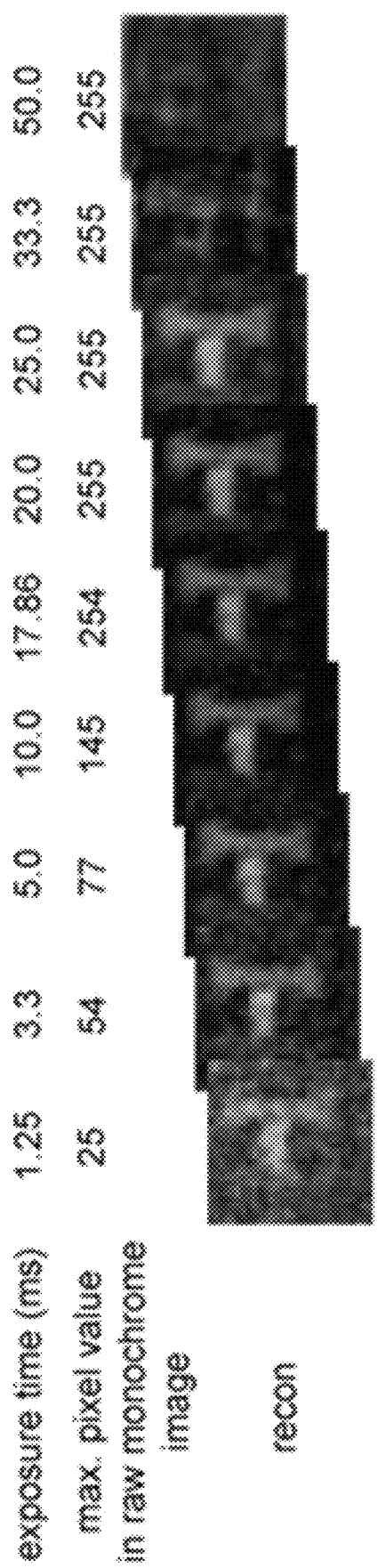
FIG. 9G illustrates reconstruction results of the 3-color letter 'H' object pattern at various exposure times. The maximum pixel values in their raw monochrome images are given.

The dynamic range of this camera was also determined. The reconstructed color images across a wide range of exposure times are summarized in FIG. 9G. The corresponding maximum pixel values in the raw monochrome images are listed as well. The critical exposure time was 17.86 ms. The reconstructed images remain acceptable down to 5 ms exposure time and becomes too noisy at exposure times less than 2 ms. Overexposure (>25 ms) also deteriorates the reconstruction because more and more pixels are saturated and the assumption of linearity breaks down. Therefore, the dynamic range of this particular camera is about 14 dB. High-dynamic-range (HDR) techniques can help to improve this metric.

Figures 10A, 10B:
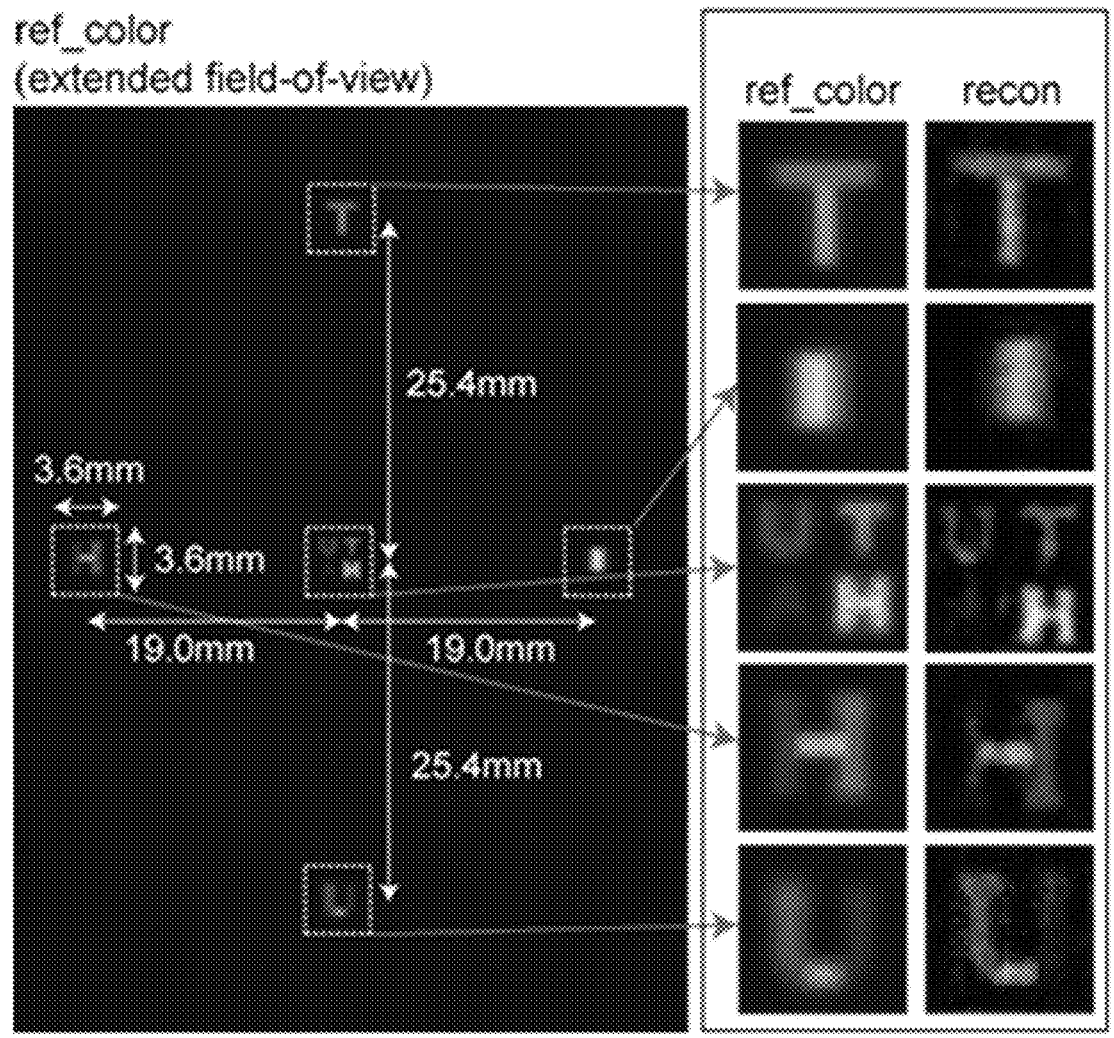
FIG. 10A-B shows imaging of an extended field-of-view.

In this demonstration, the image size is restricted to 3.6 mm×3.6 mm, since the PSF is only calibrated over 30×30 object points with step size of 120 μm. This is not a fundamental limitation of the technology, but was chosen for simplicity and to ensure fast reconstruction times. A simple approach to increase the image size can be demonstrated by using a sparse image comprised of small blocks of color data as illustrated in FIG. 10A. The blocks are spaced such that we can treat them independently. This constraint can be removed by accounting for the spatial overlap in the reconstruction algorithms. For example, areas where adjacent areas overlap can be reconstructed. Then the overlapped areas can be averaged to produce a single image. Regardless, in this example, each block (3.6 mm×3.6 mm) was then calibrated and solved individually. The results are given in FIG. 10B and only RGB images are shown for simplicity. In any case, by further optimizing the calibration process and the reconstruction algorithms, faster multi-spectral full-frame video imaging can be achieved.

Figure 11A:
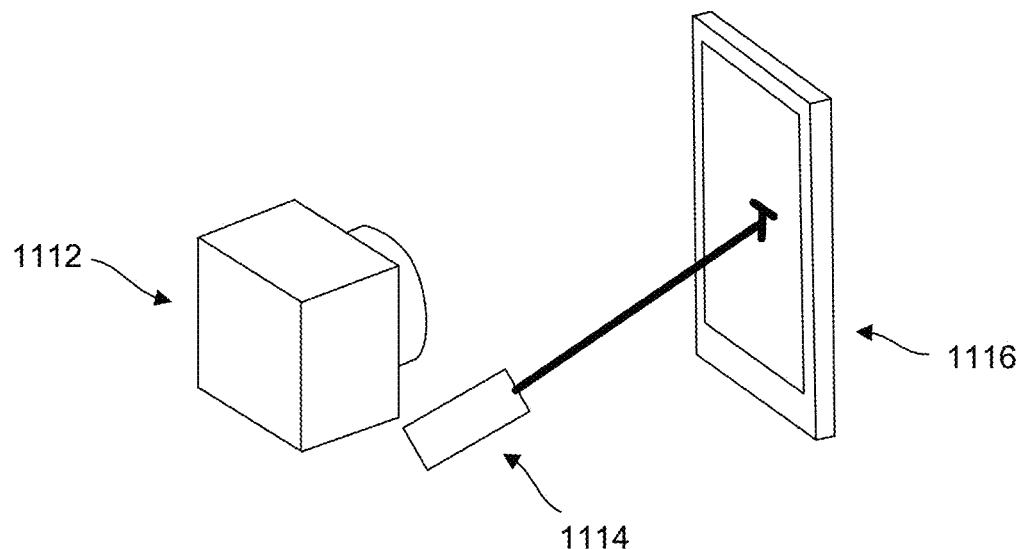
FIG. 11A is a schematic of the visible-IR imaging experiment. An 850 nm laser illuminates the iPhone 6 screen. Both the DF-based camera and the reference color camera are used to take images.
Figure 11B:
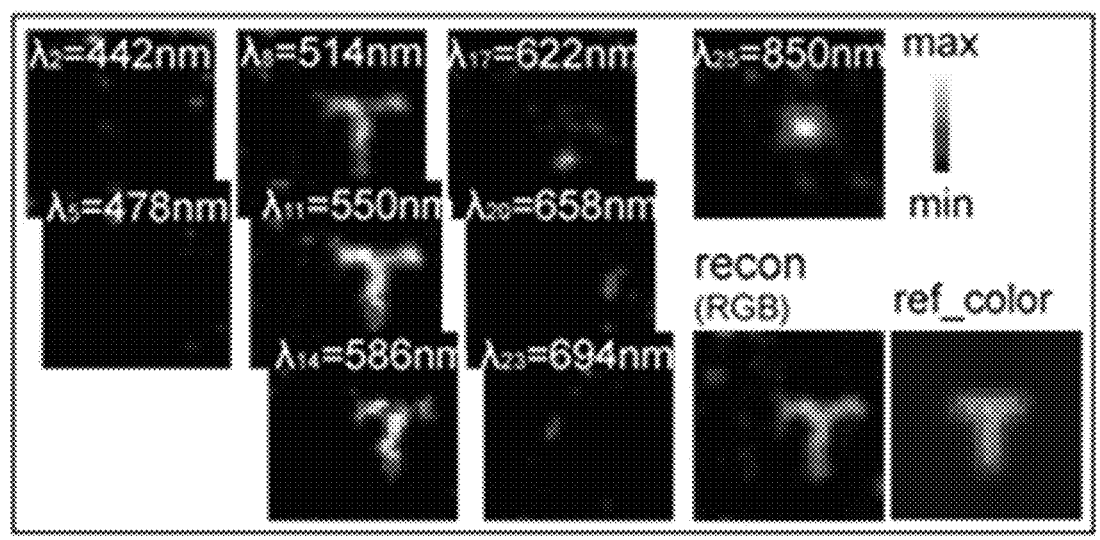
FIG. 11B illustrates examples of the reconstructed multi-spectral images using the device of FIG. 11A. A test pattern of green letter 'T' is considered. The 850 nm IR spot does not show up in the reference RGB image but can be resolved from the reconstructed multi-spectral data. The RGB color image reconstructed from multi-spectral data within the visible band is also shown.

Imaging beyond the visible light, especially in the near-infrared regime, brings a number of advantages and applications. The imaging system 1112 was calibrated experimentally at one IR wavelength of 850 nm and then conducted visible-IR imaging by simply illuminating the iPhone screen 1116 using an 850 nm laser beam 1114, as schematically depicted in FIG. 11A. FIG. 11B summarizes the reconstruction results of a test pattern of green letter 'T'. Only a few multi-spectral images are shown for simplicity, but the full multi-spectral dataset was obtained. Note that the introduction of an IR beam causes almost no cross-talk in the visible band. The shape and the position of the 850 nm laser spot can be clearly discerned in the multi-spectral image. Although the IR spot overlaps with the green pattern, it cannot be identified by the conventional color camera due to the IR cut-filter.

These approaches for computational scalability (in terms of time as well as memory usage) are summarized below.

In order to understand the computational challenge of finding a scene from sensor data, let $N_{x'}$, $N_{y'}$, $N_z$, $N_\lambda$, $N_{\vec{S}}$ be the number of discretization points used to represent the scene in x', y', z, λ, and $\vec{S}$ respectively. Hence the scene $a_{i,j,k,l,m}$ can be represented by a vector $a \in \mathbb{R}^N$, where $N = N_{x'} N_{y'} N_z N_\lambda N_{\vec{S}}$. Similarly let $N_x$ and $N_y$ be the number of discretization points in the x and y directions on the sensor. Then the sensor data can be thought of as a vector $b \in \mathbb{R}^{N'}$ where $N' = N_x N_y$. The operation in equation (2) is equivalent to the matrix vector product b=Ma, where M is a N'×N matrix that comes from simulating the metafilter response using the forward model described below. Let us assume for simplicity that N'=N. Storing M costs $O(N^2)$ bytes and solving the system to find the scene a from the sensor data b with a standard solver costs on the order of $O(N^3)$ flops (floating point operations). For a sensor with $N=10^6$ pixels, the matrix storage is in the order of terabytes ($10^{12}$ bytes) and the system solve costs in the order of exaflops ($10^{18}$ flops), per frame. To put in context, the fastest computer in the US (as of June 2016) is Titan at the DOE/SC/Oak Ridge National Laboratory and can process about 17 petaflops/second when used in its entirety. Thus, each frame would take about a minute to process using the brute force approach in the fastest supercomputer available in the US, and therefore is an enormous computational challenge. Fortunately, scalability can be achieved by relying on some unique properties of this system.

Periodicity can be exploited for storage. Since the metafilter is periodic in x, y, the impulse response is also periodic in the sense that there are numbers $p_x$, $p_y$, $p_{x'}$, $p_{y'}$ such that $$P(x+q_x p_x, y+q_y p_y; x'+p_{x'} q_{x'}, y'+p_{y'} q_{y'}, z, \lambda, \vec{S}) = P(x,y;x',y',z,\lambda,\vec{S})$$

for any integers $q_x, q_y, q_{x'}, q_{y'}$. This allows one to drastically reduce the storage requirements for M. Indeed if the metafilter period is equal to an integer number of pixels (i.e. if the units for x, y are pixels and $p_x$, $p_y$ are also integers) then storing M requires only $O(p_x p_y N_z N_\lambda N_{\vec{S}})$ bytes. To give a rough idea of the storage savings, if $N=10^6$ and $p_x=p_y=10$, storing the matrix M requires on the order of 10 gigabytes.

Periodicity can also be exploited for efficiency. Periodicity can also be used to drastically reduce the cost of finding a scene a from sensor data b. There are two ingredients to this. First, a Krylov subspace solver can solve the system with only procedures implementing the matvecs (matrix vector products) between M (or $M^T$) and a vector. For such iterative methods the main cost per iteration is typically two matvecs. A brute force implementation would require $O(N^2)$ flops per matvec. In this example, each iteration would cost on the order of teraflops ($10^{12}$ flops). If $10^3$ iterations are needed for convergence the total cost is in the order of petaflops ($10^{15}$ flops). Thus, it is not advantageous to use an iterative solver without having a more efficient way of computing matvecs. An algorithm that exploits the periodicity in the metafilter impulse response to do an M matvec with only $O(\log(N_x N_y) N)$ flops. This algorithm is based on the FFT, which is embarrassingly parallel and is well suited for implementation on GPUs. For $N=10^6$, a Krylov subspace iteration requires on the order of a megaflop. If we need $10^3$ iterations for convergence, then the number of flops needed is a teraflop per frame. The latest GPU from NVidia (Tesla P100, Pascal microarchitecture) can reach 5 teraflops, which could allow processing of a frame per second. With these approaches, video at 16 frames per second with hyperspectral, depth, and polarization information may be achieved.

Figure 12A:
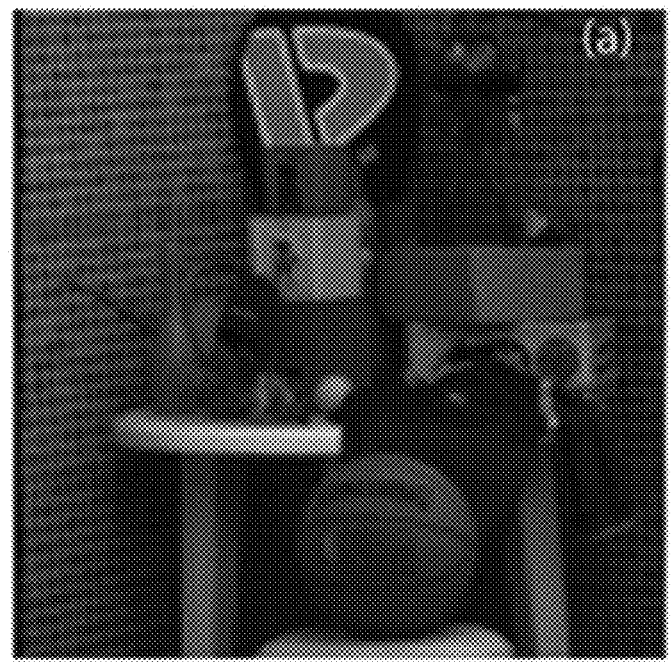
FIGS. 12A-D illustrates preliminary simulation results of full-frame multi-spectral imaging.
Figure 12B:
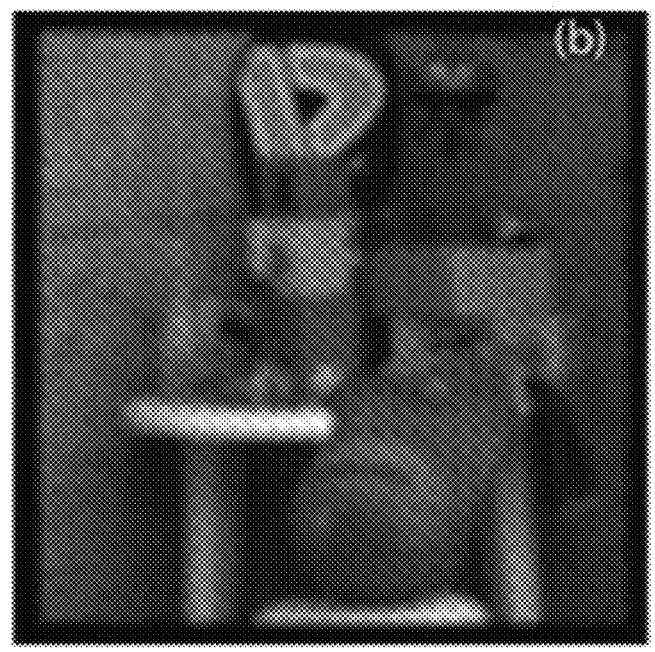
Figure 12C:
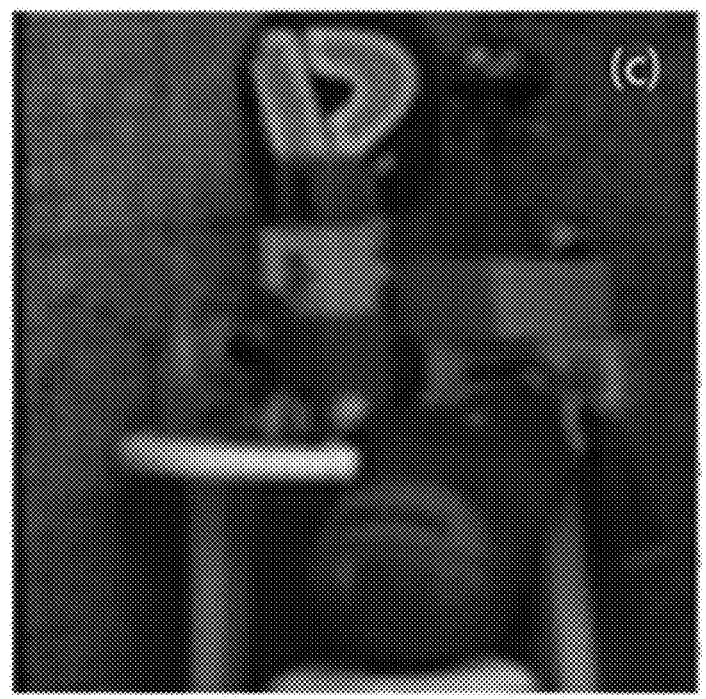
Figure 12D:
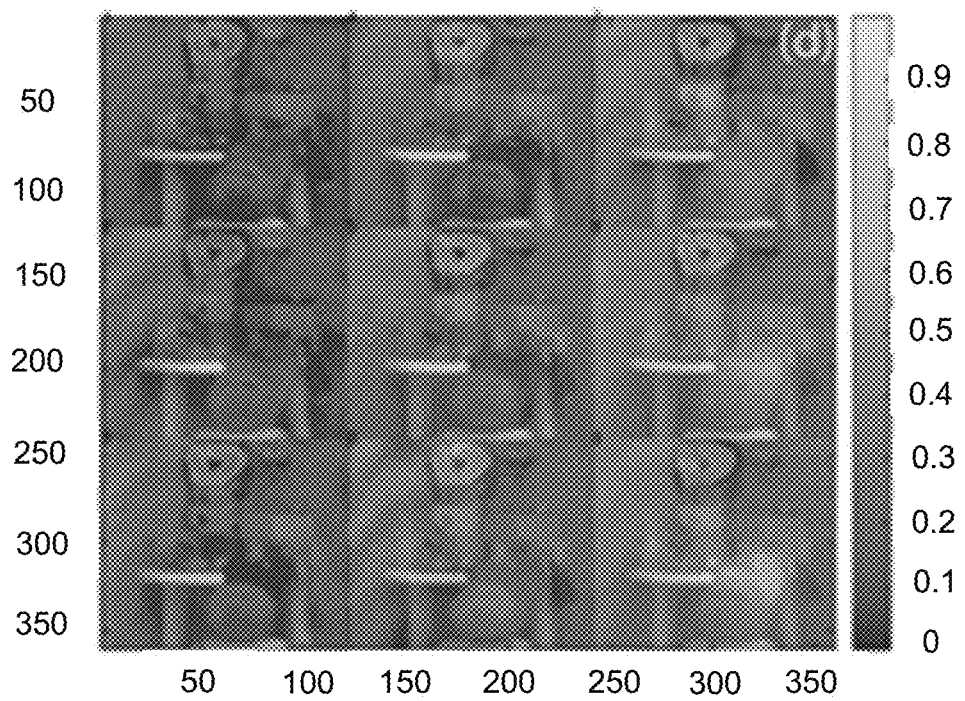

Regularization can also improve results. The previous discussion focused on simply solving the linear system and made the simplifying assumption that the number of parameters N' to be recovered from the scene is identical to the number of sensor pixels N. In reality, this may be an under-determined problem, i.e., N'>N, and regularization would be needed to obtain meaningful images. This can be achieved by solving the optimization problem:

$$\min_{a \in C} \|Ma - b\|_2^2 + R(a),$$

where $\|\cdot\|_2$ denotes the Euclidean or $\ell_2$ norm and R(a) is an appropriate regularization or penalty term, which enforces prior information available about the scene a by penalizing scenes that do not conform to the prior. The set C represents appropriate constraints (e.g. non-negativity). In the hyperspectral image case $C$ with no polarization or depth information (i.e. $N_z = N_{\vec{s}} = 1$). Let D be a matrix computing discrete gradients for the scene a, e.g. Da calculates the discrete spatial gradient in x: $a_{i+1,j,k,l,m} - a_{i,j,k,l,m}$ and similarly for the other indices. The regularized problem solved is then:

$$\min_{a \in C} \mu \|Ma - b\|_2^2 + \|Da\|_1,$$

where μ is a positive regularization parameter and $\|\cdot\|_1$ this the $\ell_1$ norm. Preliminary results for the hyperspectral problem are shown in FIG. 12A-C. The original image comes from a hyperspectral database, reduced to 9 wavelengths in the 430-780 nm visible range and is displayed in RGB (FIG. 12A). The sensor data (FIG. 12B) is simulated using a random impulse response which encodes the color information as patterns in the image. The reconstructions using the same 9 wavelengths are displayed in both RGB and hyperspectral formats in FIGS. 12C and 12D.

Manipulation of polarization of light is extremely important for a variety of applications ranging from communications to imaging. Conventional polarization selection devices (or polarizers) use absorption or reflection to discard the unwanted polarization. In these polarizers, the maximum achievable transmission efficiency of the desired polarization is 50%. Commercial polarizers typically demonstrate transmission efficiencies that are lower. A new approach to designing a metamaterial polarizer can rotate one polarization by 90 degrees, while the orthogonal polarization is transmitted undisturbed. Thereby, such a polarizer allows for substantially higher transmission efficiencies in the desired polarization.

Most conventional polarizers are based upon form birefringence or total internal reflection effects in crystals or polymers, which cause phase retardation between the two orthogonal polarizations. Recently, a variety of novel approaches to polarization rotation have been proposed. Some of these employ surface gratings, whose scattering vectors are different from the polarization state of the incident light to achieve polarization manipulation. Other devices achieve polarization manipulation using metasurfaces, i.e., carefully designed antennae that impart an abrupt phase change at an interface. An alternative approach is to use subwavelength structures to manipulate polarization across a wavefront (inhomogeneous polarization). Polarization-manipulation devices have been utilized for a variety of applications. Recently, these ideas have been generalized by combining conventional computer-generated holography with subwavelength control for manipulation of phase, amplitude and polarization of light. Related work described optical transmission by reflection-less meta-surfaces. Polarization rotation of zero-order transmitted light through a perforated metal film was also recently demonstrated. Experimental demonstration in the microwave regime was also given. These approaches utilize metallic antennae on a single surface, which suffer from parasitic absorption. Nevertheless, only one polarization is manipulated in all previous devices, resulting in less than 50% transmission efficiency, when illuminated by both polarizations.

Figure 14A:
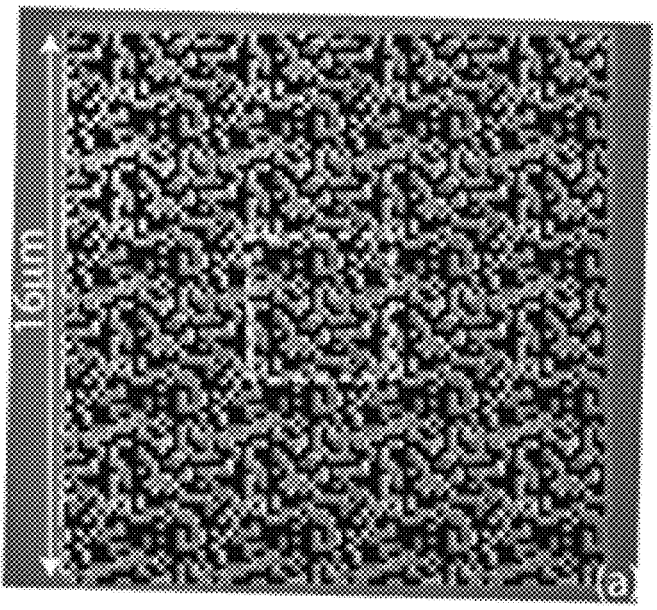
FIG. 14A is a scanning-electron micrograph of the metamaterial polarizer. One unit cell is 4 μm×4 μm (yellow dashed lines).

In contrast, the present device is based upon an all-dielectric material that is patterned at subwavelength dimensions so as to enable independent manipulation of both polarizations. To illustrate the principle, a metamaterial polarizer was designed, fabricated and characterized that operates by allowing one polarization to transmit undisturbed while rotating the orthogonal polarization by 90 degrees. The configuration of the device is illustrated in FIG. 14A with an expanded view of one section shown in FIG. 14B. Just as in a computer-generated hologram (CGH), our device is comprised of discrete square pixels. However, unlike a conventional CGH, the pixel dimensions are far smaller than the wavelength. Each pixel is formed by etching into the transparent dielectric, silicon ($\lambda_0 = 1550$ nm). The etch depth of each pixel is different and is determined via a nonlinear optimization algorithm.

One design goal was to determine the etch depth of each pixel such that a desired phase, amplitude and polarization distribution of light is obtained upon transmission through the device. In these examples, the pixel size was constrained to 200 nm×200 nm to enable fabrication. For computational expediency, the device size was limited to 20×20 pixels, corresponding to a total dimension of 4 μm×4 μm. Furthermore, periodic boundary conditions were applied along the X and Y directions that allows the unit to be repeated in 2D. The maximum aspect ratio was also constrained for ease of fabrication.

Figure 13A:
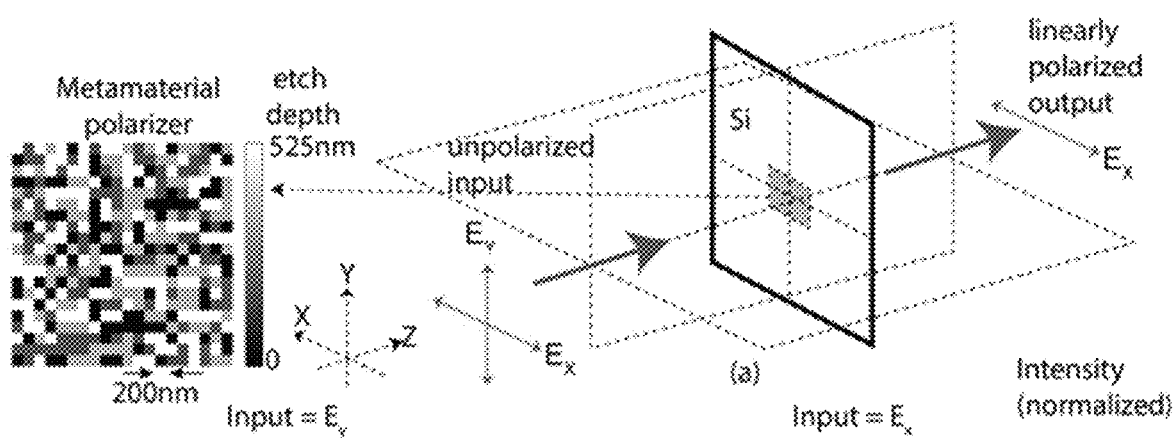
FIG. 13A is a schematic of a high-efficiency metamaterial polarizer. The design (left) is comprised of etched square pixels in silicon.
Figures 13B, 13C, 13D, 13E:
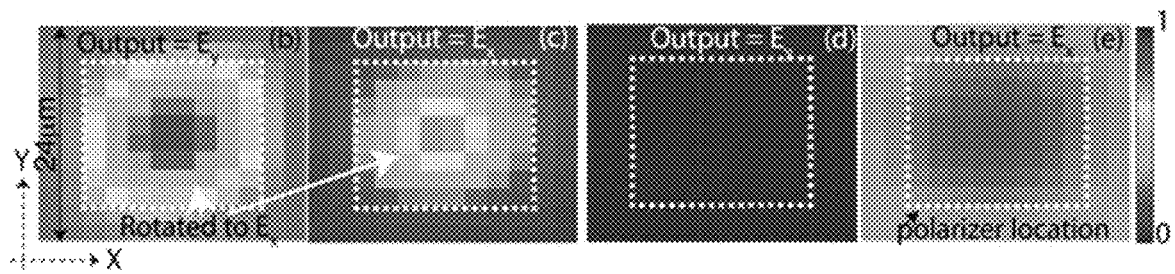
FIG. 13B shows simulated light intensity distributions after transmission through the polarizer for Ey.
FIG. 13C shows simulated light intensity distributions after transmission through the polarizer for Ex.
FIG. 13D shows simulated light intensity distributions after transmission through the polarizer for Ey input
FIG. 13E shows simulated light intensity distributions after transmission through the polarizer for Ex input. The white dashed lines indicate boundary of the finite device.
Figure 14B:
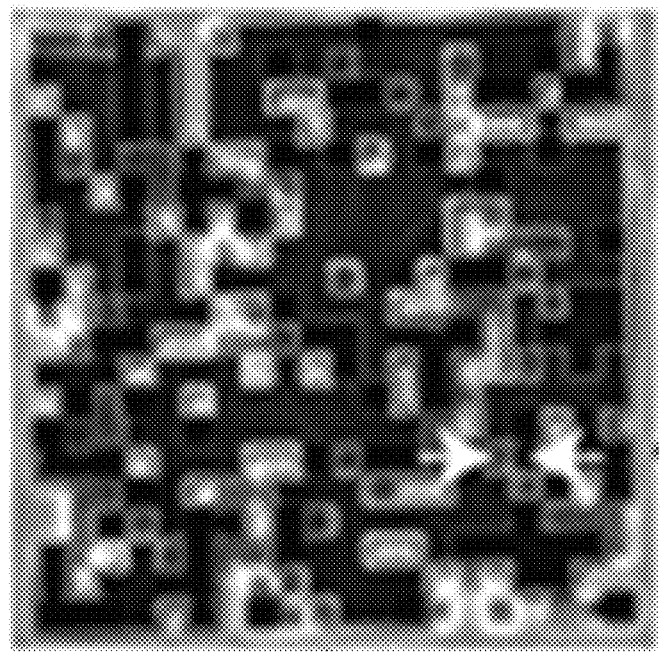
FIG. 14B is a magnified view of FIG. 14A showing pixels with a period of 400 nm.
Figures 14C, 14D, 14E, 14F:
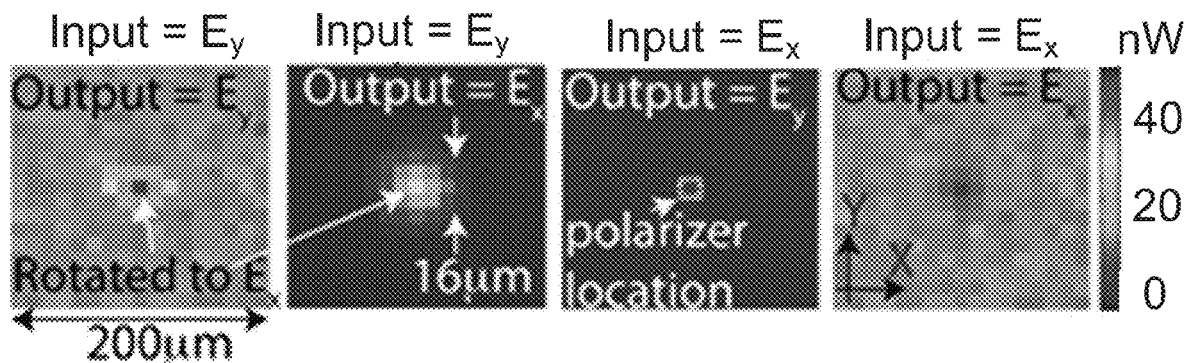
FIG. 14C-14F illustrates measured transmitted power as a function of position in the X-Y plane.
Figure 14G:
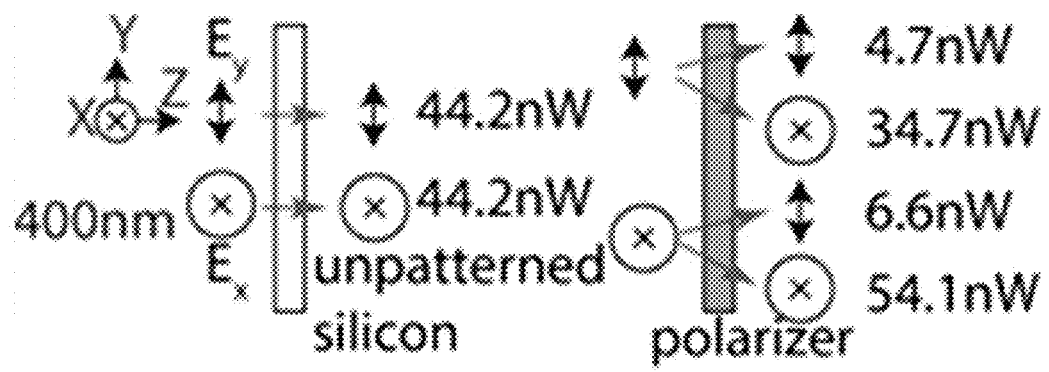
FIG. 14G is a schematic comparison of the measured peak transmitted power in Ex and $E_y$ between unpatterned silicon and the metamaterial polarizer.

The design was performed by a modified version of the direct-binary-search (DBS) algorithm. Here, the optimization variables are the etch depths of each of the 200 nm×200 nm pixels in the device. The algorithm attempts to maximize a figure-of-merit, which was defined as the transmission efficiency at the desired polarization (Ex in FIG. 13A and FIG. 14C), when the polarizer is illuminated by both polarizations (Ex and Ey) with equal amplitude. The optimized design is shown on the top left of FIG. 13A. Although the design was performed using periodic boundary conditions, the fabricated device was comprised of 4×4 unit cells (total size of 16 µm×16 µm). In other words, the polarizer was surrounded by unpatterned silicon. The performance of this fabricated device was simulated and summarized the results in FIGS. 14B-14E. When illuminated by collimated linearly polarized light with polarization along the Y-axis (Ey source), the output light intensity in Ey decreases (FIG. 13C), while that in Ex increases as shown in FIG. 14C. In other words, the input field oriented along the Y-axis after propagation through the polarizer is substantially rotated such that it is oriented along the X-axis. On the other hand, when the device is illuminated with light polarized along the X-axis (Ex source), it transmits mostly undisturbed as shown in FIG. 14C-F. Small perturbations of the fields in the output are due to diffraction at the boundary of the polarizer, where the periodic-boundary conditions are not satisfied. Spatial non-uniformity of the transmitted fields is expected, since the unit cell does not exhibit any symmetry. Is was also confirmed using simulations that only 13% of the incident light is reflected, while 74% of the incident light was transmitted into the desired Ex polarization. As shown in FIG. 14G, compared to the surrounding unpatterned silicon, the transmission of Ex is enhanced by 110% and the ratio of the transmitted power at Ex to that at Ey at the output is calculated to be 8.8.

The device was fabricated by etching into silicon using focused-ion-beam lithography using gallium ions. Different etch depths are achieved by varying the deposited energy or exposure dose at each location. FIG. 14A shows the scanning-electron micrograph of a fabricated device comprised of 4×4 unit cells, where each unit cell is 4 µm×4 µm (denoted by dashed yellow lines). A magnified view of one unit cell in FIG. 14B shows the multiple etch depths and the square pixels.

In order to characterize the polarizer, the was illuminated with collimated linearly polarized light from a 1550 nm laser (Hewlett Packard model no. 8168E). The transmitted power was measured using a lens and a photodetector from a spot of size 14 µm on the sample. A conventional polarizer was placed at the output to measure the power at the two orthogonal polarizations separately. A half-wave plate and a polarizer were used at the input to first align the direction of polarization to the Y-axis of the metamaterial polarizer. Then, the device was stepped in the X-Y plane using a stage, while the photodetector registered the transmitted signal. The resulting image is shown in FIG. 13C. The dashed white square shows the location of the metamaterial polarizer. Behind the device, the power in the Ex polarization is dramatically increased while that in the Ey polarization is correspondingly reduced. The experiment was repeated after aligning the incident polarization to the X-axis of our polarizer. As shown in FIG. 13C, the transmitted power is almost entirely in the Ex polarization, since the electric field oriented along the X-axis is transmitted undisturbed. FIG. 14G schematically compares the transmitted power between the metamaterial polarizer and unpatterned silicon. When illuminated by both polarizations, the metamaterial polarizer transmits a total of 88.8 nW in Ex compared to just 44.2 nW for unpatterned silicon. This increase is primarily due to the incident power in Ey being rotated 90 degrees into Ex upon transmission. The measured results agree well with the simulated enhancement of 110%. The measured ratio of the transmitted power at Ex to that at Ey at the output is 7.8, which agrees with the simulated value of 8.8.

It has been reported that polarization rotation occurs when the scattering vector is different from the polarization of the incident light. The scattering structure, defined by the present design, consists of a large number of locally varying scattering vectors. The scattering vectors vary with position not only in the planes perpendicular to the propagation direction but also along the propagation direction. The transmitted light after the metamaterial polarizer is the superposition of light scattered from all these elements (see FIG. 2A). The optimization process is thus attempting to create a distribution of scattering vectors such that the cumulative effect after transmission is that one polarization state (Ex) is allowed to pass through with low loss, while the orthogonal polarization state (Ey) is rotated by 90 degrees. The electric fields were analyzed within the device and show that the rotation of the Ey modes is primarily due to the near-field coupling between multiple resonant-guided modes that are excited upon illumination, similar to what has been reported in photonic crystals. By analyzing the time-averaged intensity distribution in each layer of the device, it was shown that when illuminated by a source polarized along the Y-axis, dipoles that are polarized along the X-axis are excited at the corners of each isolated pillar in the first layer. Such dipoles then couple energy into the structures in the adjacent layers of the metamaterial polarizer. Eventually, the last (third) layer of the polarizer radiates energy into the far-field, still maintaining the polarization along the X-axis. This is further confirmed by analyzing the time-dependent field variation in the XZ and YZ planes in the vicinity of the hot-spots.

There is an apparent decrease in entropy due to the conversion of randomly polarized input light into linearly polarized output with high efficiency. This is not really true, since the decrease of the polarization degree of freedom is accompanied by a larger increase in the spatial frequencies of the output wavefront. In other words, although the incident light is collimated, the transmitted light radiates in multiple directions. A careful analysis of the tolerance of the metamaterial polarizer to fabrication errors was also performed. The devices were robust to fabrication errors corresponding to about 8% of the pixel size. Small slopes in the sidewalls of the pixels also introduce only minor changes to the performance of the device. Although the device was designed for a single wavelength, the bandwidth was calculated to be ~20 nm. By incorporating a broadband source during design, it is possible to increase the device bandwidth further.

Figure 15A:
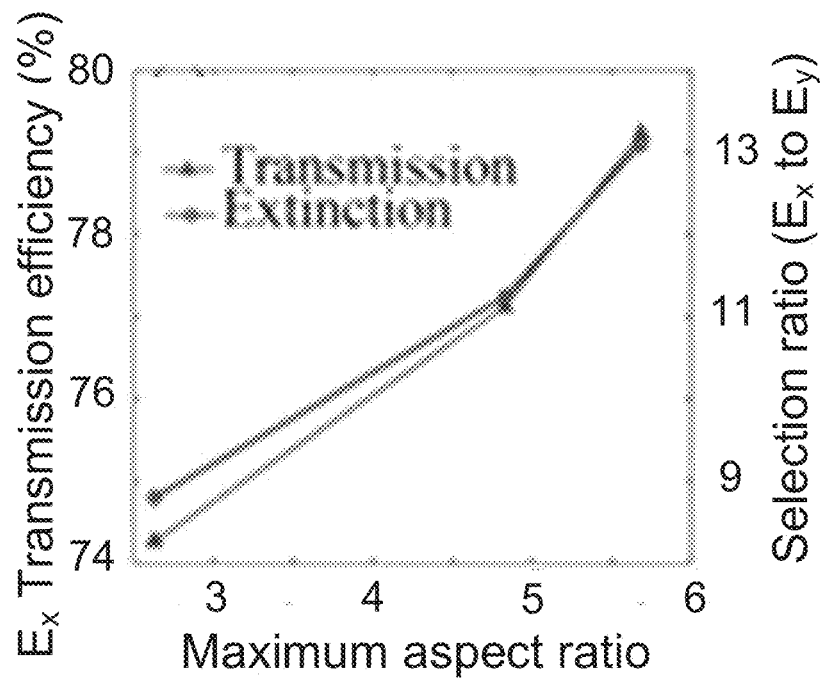
FIG. 15A is a graph of transmission efficiency (at Ex) and selection ratio (power in Ex to power in $E_y$) as a function of maximum aspect ratio.
Figure 15B:
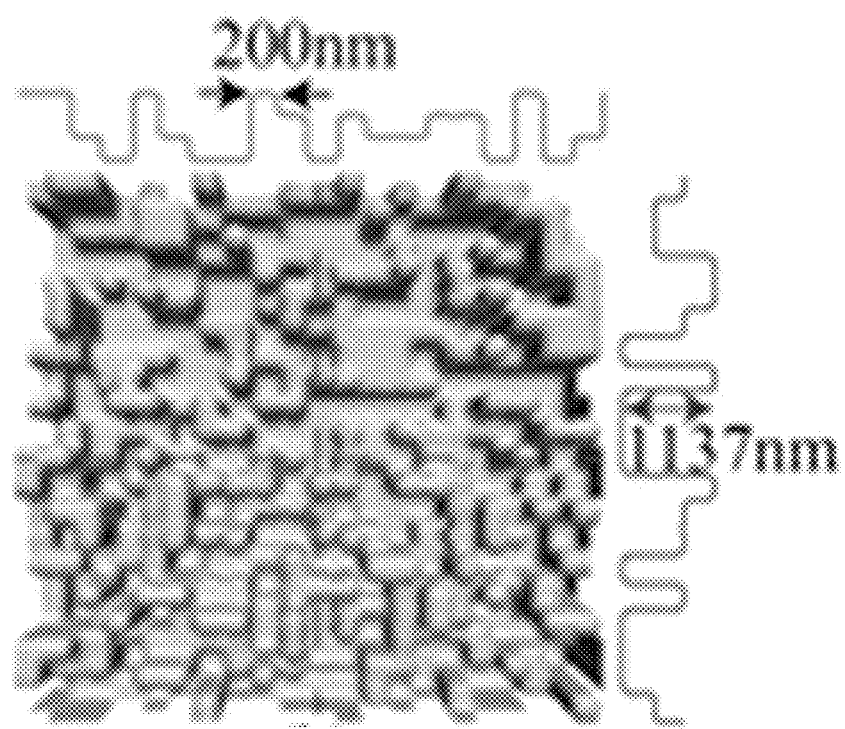
FIG. 15B is a metamaterial filter with transmission efficiency of 80% and maximum aspect ratio of 5.7 in one example.
Figure 15C:
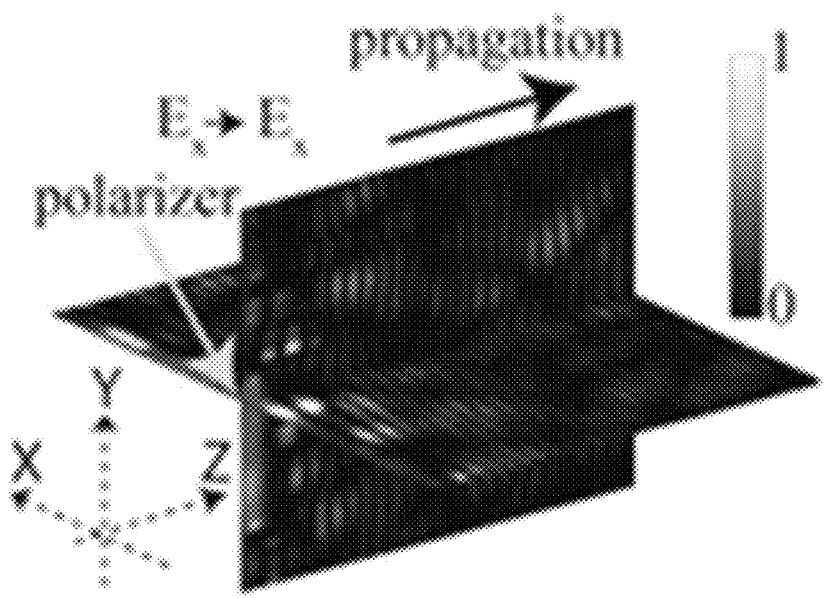
FIG. 15C-F are time-averaged intensity distributions after the device for Ex source (c and d) and for Ey source (e and f). The polarizer is located in the XY plane at the left-edge.
Figure 15D:
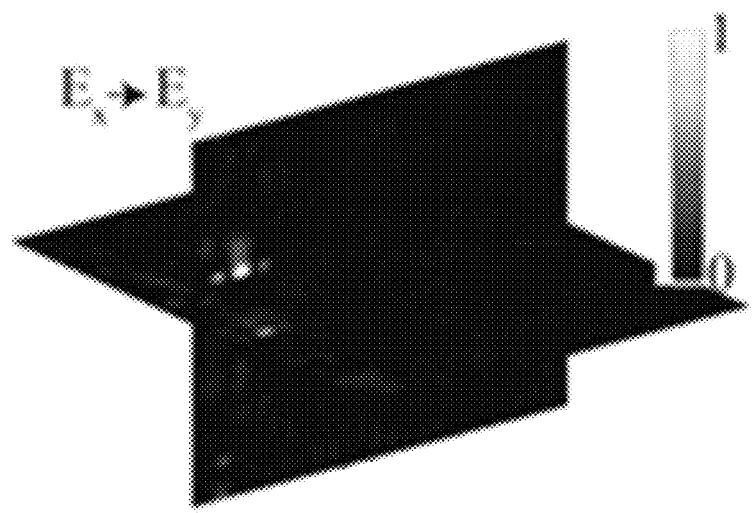
Figure 15E:
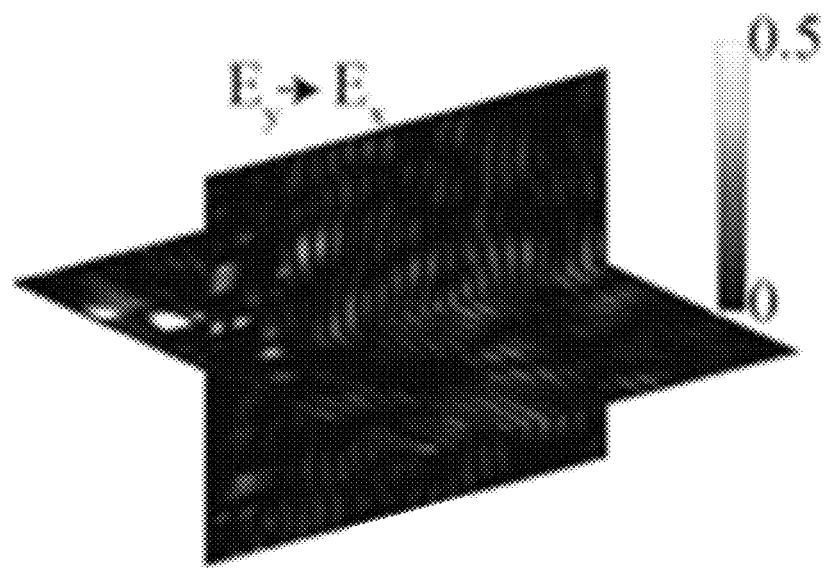
Figure 15F:
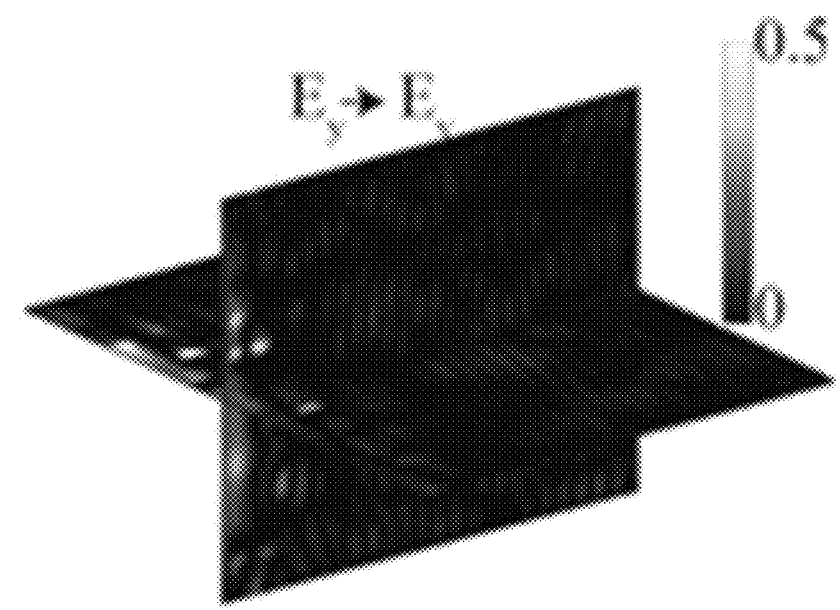

In order to ensure ease of fabrication, a constraint was applied on the maximum aspect ratio (defined as the ratio of the maximum etch depth to the pixel size). For the fabricated device, the maximum aspect ratio was 2.6. A series of designs was performed with higher maximum aspect ratios and realized that the performance of the device can be enhanced. FIG. 15A shows the transmission efficiency at Ex and the selection ratio (power in Ex to power in Ey) as a function of the maximum aspect ratio. As the aspect ratio is increased, the transmission efficiency at Ex under unpolarized input can increase to almost 80%. The design for a maximum aspect ratio of 5.7 is shown in FIG. 15B. The simulated electric field distributions in the X-Z and Y-Z planes after transmission through the metamaterial polarizer are shown in FIGS. 15C and 15D for Ex source, and in FIGS. 15E and 15F for Ey source. FIGS. 15C and 15E show the electric-field distributions polarized along X, while FIGS. 15D and 15F show the electric-field distributions polarized along Y. As expected, the polarizer rotates the incident Ey fields into Ex at the output, while the incident Ex fields transmit undisturbed. Note that no attempt was made to control amplitude in this case and hence, the transmitted intensity shows non-uniformity in the X-Y plane.

Figure 15G:
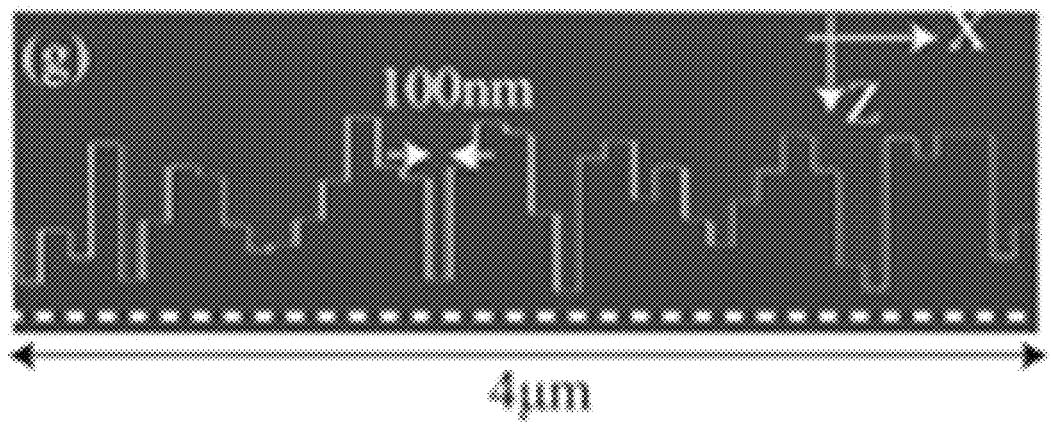
FIG. 15G is a 2D device designed for polarization separation and focusing in one example.
Figure 15H:
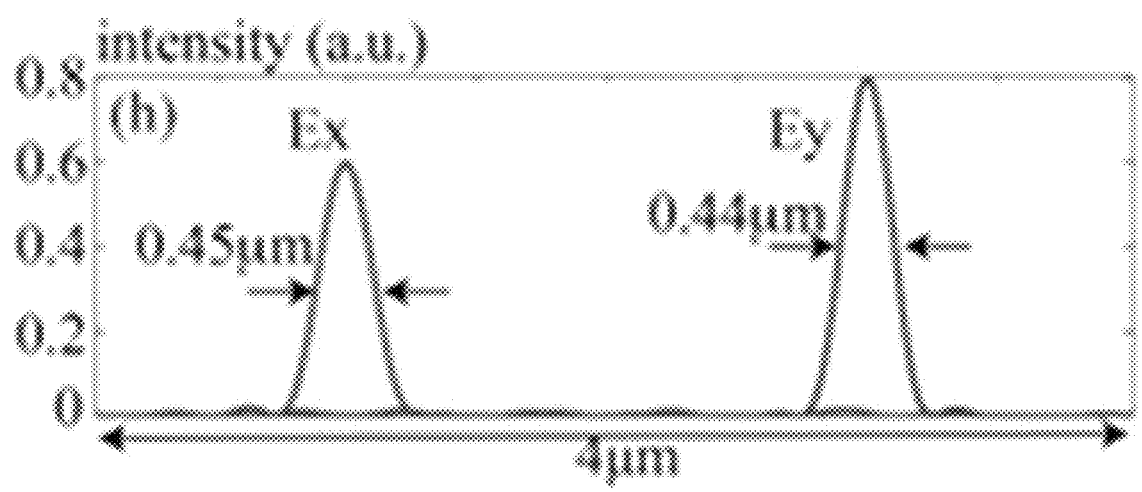
FIG. 15H is a graph of intensity distribution along the dashed white line in FIG. 15G when the device is illuminated by $E_x$ and $E_y$ simultaneously.

This design can be extended to control the phase, amplitude and polarization of light. To demonstrate this capability, a device was designed that spatially separates and localizes fields according to their polarization in the plane normal to the direction of propagation. In order to simplify the computation, this device was designed in 2D and the optimized design is illustrated in FIG. 15G. When this device is illuminated by an unpolarized source from above propagating from top to bottom, the electric fields are spatially separated along the X-axis as shown by the intensity distributions in FIG. 15H. The input field was uniform along the X-axis for both polarizations. However, at the output, Ex becomes confined to a 0.45 µm-wide region on the left half, while Ey is confined to a 0.44 µm-wide region on the right half. Note that this polarization separation is achieved within a propagation distance of only 1500 nm (less than the free-space wavelength of 1550 nm).

The new metamaterial polarizer can rotate one polarization by 90 degrees, while allowing the orthogonal polarization to transmit unperturbed. This polarizer was able to enhance the transmission of one polarization by 100% compared to an unpatterned film. Appropriate design of these devices can achieve absolute transmission efficiencies at one desired polarization of almost 80% at the design wavelength (1.55 µm). This approach is readily generalized to manipulate the phase, amplitude and polarization state of electromagnetic fields at the subwavelength scale. The demonstrated device can have significant implications in imaging systems and displays (when extended to visible wavelengths). Although the extinction ratio for this example device is smaller than conventional polarizers, the metamaterial polarizer can be useful where transmission efficiency is particularly important. Other interesting applications include the ability to efficiently generate complex modes that may be useful in quantum entanglement and expanded bandwidth in telecommunications.

Figure 17:
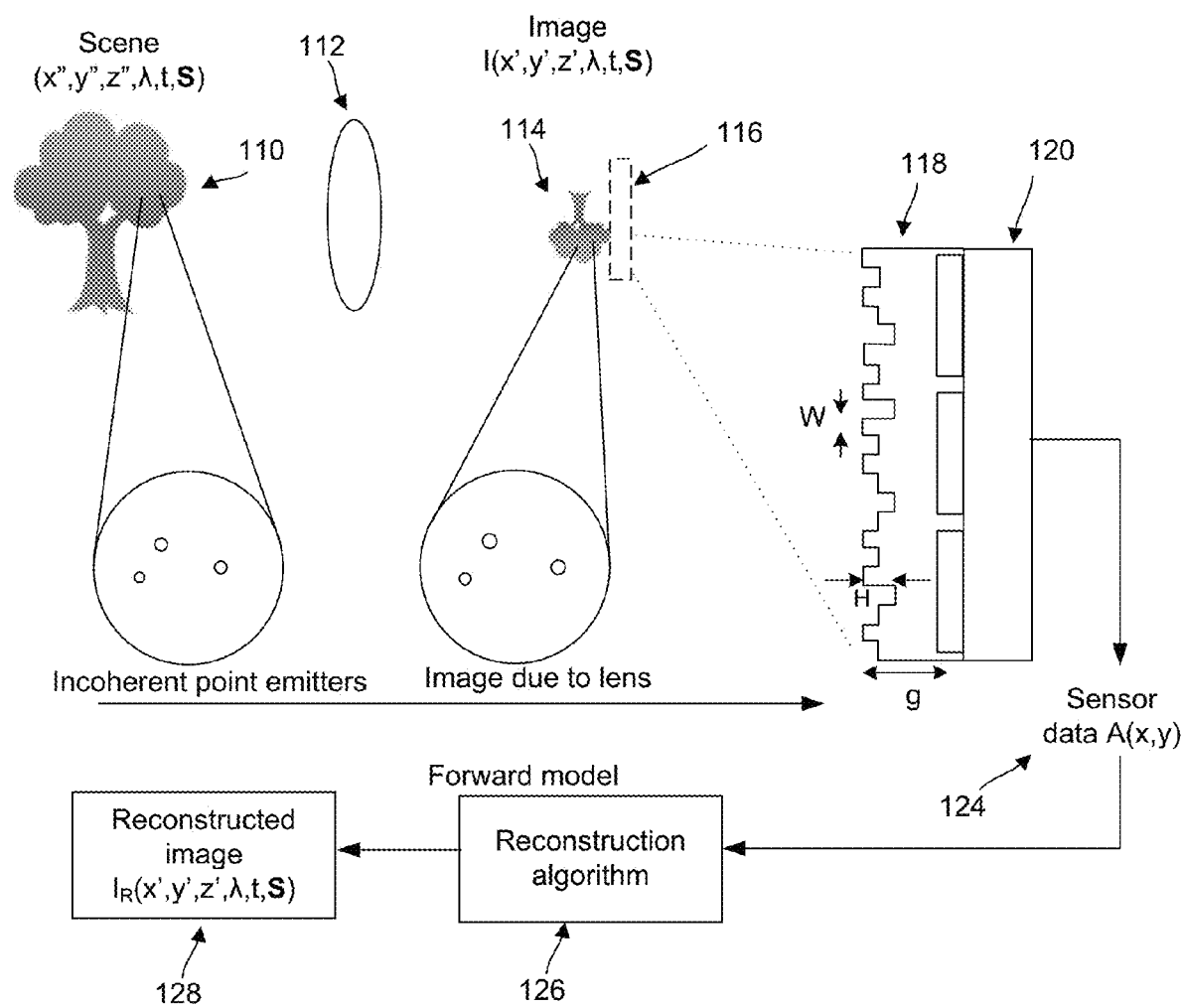
FIG. 17 is a schematic of a forward model which allows computation of the sensor data for a given scene and lens-metafilter-sensor characteristics. The reconstruction algorithm enables computation of the 9D field of the scene. The metafilter geometry is designed via an optimization process as described herein.

The metafilter was also able to distinguish between the 2 linear polarization states using the metric defined in Equation 3. To simplify the computation, a single point in space (x, y, z) was assumed, which corresponds to a point in the intermediate image formed by a conventional lens (see FIG. 1). A single wavelength of emission at 600 nm was also assumed. After a very preliminary optimization process, a metafilter design was produced. In FIG. 16A, the intensity distribution was plotted on the sensor plane for the 2 polarization states. Clearly, the sensor data was able to readily distinguish between the 2 states. FIGS. 17B and 17C show the simulated intensity distributions (time-averaged) for the 2 orthogonal linear polarization states, respectively. In this particular example, the metafilter offers sufficient form birefringence in order to spatially separate the peaks of the 2 polarization "quasi-images" formed on the sensor. Compare this also to the polarization separation achieved in FIG. 15H.

The metafilter geometry can be designed using an optimization process that enables the computational reconstruction of the 9D field of the scene. A rigorous simulation (forward) model (see FIG. 17) can be used. A fully rigorous vectorial electromagnetic model of the system including the lens 112, metafilter 118 and image sensor 120 can be used to simulate the raw data 124 measured by the sensor. The scene 110 can be modeled as a collection of incoherent point sources (each point having random phase). The image 114 formed by the lens on the metafilter 118 can be computed using a rigorous model of the lens. Finally, the metafilter can interact with the image and the fields can be propagated onto the CMOS sensor using FDTD code. The sensor quantum efficiency can be applied to compute the measured sensor data, then reconstructed as an image 128 via a reconstruction algorithm 126. Since most natural scenes can be modeled as incoherent point sources, the image along each of the 8 dimensions (x, y, z, λ, $S_1$, $S_2$, $S_3$, $S_4$) are independent of one another, which enables us to perform the forward model in an embarassingly parallel manner. The software for the forward model can be written to take advantage of this potential.

Given that practically any 2D pattern can be fabricated with lithography, an important application for computational electromagnetics is large-scale device design involving tens or hundreds of parameters. This is challenging in the nanophotonics regime, since complex wave scattering effects give rise to highly nonlinear objective functions. The typical heuristic approach to electromagnetic design is based on trial and error involving a few degrees of freedom and stochastic evaluation (e.g., simulated annealing, genetic algorithm) of a large parameter set. A more effective approach to finding local optima is gradient-based optimization based on methods such as steepest descent and conjugate gradients. In this case, the gradient of the objective function with respect to the design parameters. The gradient can also be used for sensitivity analysis involving experimental uncertainties. Moreover, the gradient is important for inverse design: finding a problem given the solution. However, computing the gradient for a large number of parameters is challenging since normally two calculations are required for each parameter. These calculations are costly since they are based on a complete solution of Maxwell's equations via the electromagnetic solvers. Adjoint methods can be used to compute the gradient using only two calculations independent of the number of parameters. Thus, adjoint methods for computational electrodynamics can be used to rapidly design complex 3D metafilters devices with tens to hundreds of parameters over a broad bandwidth.

There have been a limited number of demonstrations of adjoint methods for device design in computational electromagnetics. Finite difference frequency domain (FDFD), finite difference time domain (FDTD), and boundary-element methods (BEM) have been used to design waveguide couplers, waveguide bends, and beam splitters. These have been based on simple geometries, mostly in 2D, with a small number of shape parameters operating over a narrow bandwidth. Broad bandwidths are more challenging to optimize due to the larger number of local optima. Therefore, complicated device geometries with a large number of parameters over broad bandwidths may be designed by leveraging low-cost, scalable HPC in the commercial cloud.

The most general and versatile tool is MEEP, which implements the finite-difference time-domain (FDTD) method that solves Maxwell's equations on a discrete time and space grid. MEEP is well suited to computing quantities that involve evolution of the electromagnetic fields, such as transmission and resonance decay-time calculations. There are two principal advantages of FDTD for device design: (1) a short temporal pulse yields a broadband spectral response and (2) the explicit time stepping enables parallelization of large computational volumes. MEEP's sub-pixel smoothing algorithm for lossless dielectrics improves the accuracy of simulations at coarse resolutions. This enables the size and duration, as the temporal resolution is directly proportional to the spatial resolution due to numerical stability constraints to be significantly reduced, while still ensuring accuracy. Sub-pixel smoothing can be particularly useful for the metafilter designs. Also, geometric parameters may be continuously varied, as in device optimization studies, without spurious numerical artifacts degrading simulation accuracy. In cases where perfectly matched layers (PMLs) for absorbing boundaries irrevocably fail, MEEP supports adiabatic absorbers with an arbitrary absorption profile. This enables the size and numerical artifacts of absorbing regions to be reduced in important problems.

MPB is an eigenmode solver that uses the conjugate-gradient algorithm to minimize the Rayleigh quotient using a planewave basis. It is used to compute definite-frequency eigenstates of Maxwell's equations in periodic dielectric systems. This includes the dispersion relation (i.e., band diagram) of dielectric structures with discrete or continuous translational symmetry. MPB is integrated with MEEP to enable an eigenmode source feature.

The geometry of the engineered metamaterial filter (metafilter) as well as the distance of the metafilter from the sensor and the lens-image plane can be determined based upon the image-reconstruction problem as described previously (also illustrated in FIG. 18). Useful parameters are the minimum feature size (W), the maximum feature depth (H, which is determined by the aspect ratio) and the distance between the metafilter and the photodiode (g). Minimization of the maximum cross-correlation between the various responses as described by equation (4) can be an initial approach for designing the metafilter for a specific set of design conditions. More sophisticated objective functions such as minimizing the condition number of the resulting linear system can also be used. The optimization may also involve the full forward and inverse reconstruction. Techniques such as level set and adjoint methods can also be used for designing the metafilter geometry. A binned super-pixel approach can also be used to simplify the computation initially in order to get initial guess solutions that can then be used with the full iterative solver.

It is important to understand the impact of the camera performance on various system errors that could occur during the fabrication of the metafilter as well as during the assembly of the system. Errors during the calibration process can also be analyzed. This sensitivity analysis can be performed using the forward and inverse models developed during this thrust.

One challenge is solving the system b=Ma efficiently and another is to properly deal with total variation regularization. To solve the system we can generalize the M matvec algorithm for hyperspectral imaging to deal with polarization and depth information. A 1024×768 video at 8 fps (frames per second) with hyperspectral, polarization and depth information on a Pascal GPU equipped workstation. Progressively faster M matvec versions of this procedure can be developed. Core-level parallelization (with existing FFT libraries such as FFTW and/or via MPI) can be used.

Solving a total variation regularized linear system for the large scale systems can be a challenge. Indeed total variation is a non-linear and non-smooth regularization term that needs to be dealt with properly. Although other options can be used, two ways of solving this problem are described here. An algorithm where the total variation term is split between a least squares term and an $\ell_1$ term by introducing auxiliary variables w to track gradients:

$$\min_{a \in C, w} \mu \|Ma - b\|_2^2 + \beta \|Da - w\|_2^2 + \|w\|_1,$$

where $\mu$ and $\beta$ are regularization parameters. The algorithm alternates between an inexact solve with a Krylov subspace method of the least squares problem obtained by keeping w fixed and an exact solve of the $\ell_1$ problem resulting from keeping a fixed. Another way is to use Nesterov iteration, which like Krylov subspace solvers, only needs matvecs and is well adapted to minimize non-smooth objective functions such as those involving total variation. The algorithm based on FTVD has been implemented in the hyperspectral case but needs to be adapted to deal with depth and polarization information. This involves evaluating whether total variation in space remains a good regularization choice for the imaging problem with hyperspectral, depth and polarization information.

The FTVD based algorithm involves a Krylov subspace solver, which can be run without any preconditioning. Finding good preconditioners could result in a dramatic reduction in iterations needed for convergence. Some preconditioning options include: (a) solving for a coarse (low spatial frequency) image, (b) a multiscale preconditioner that sweeps from low to high spatial frequency, (c) solving for a partial image corresponding to an area of the full frame (block Jacobi type), and finally (d) using the fact that M can be expressed as a sum of spatial convolution operations, and thus a good preconditioner can be the sum of the corresponding deconvolutions.

Because the dielectric metafilters can contain features with linewidths well below the wavelength of light, it is important to reduce the difficulty of fabrication, specifically by reducing the ratio of height to width of required features. This means that dielectric materials of high refractive index, i.e., n>2.0 tend to be more desirable. Candidate high-index materials include, but are not limited to: $Si_3N_4$, $TiO_2$, diamond, GaN and GaAlN. $Si_3N_4$ is an attractive candidate due to the extensive research the semiconductor industry has done on it over several decades, plus the fact that it is readily deposited in various compositions from low-stress Si-rich to stoichiometric.

Figure 18:
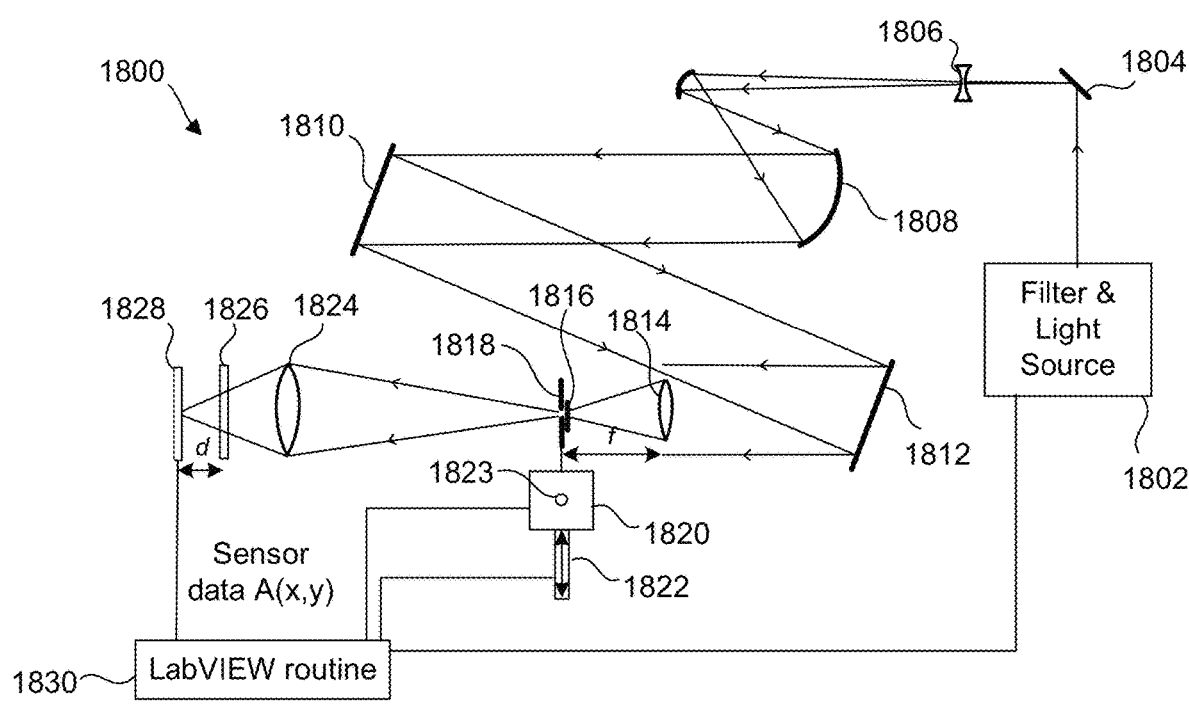
FIG. 18 is a schematic of an experimental setup for computational multi-spectral imaging measuring all the PSFs in the system matrix A for the visible band in accordance with another example.

An experimental system 1800 is illustrated in FIG. 18 which was used to measure the point-spread-functions (PSF) of the constructed camera of DF-sensor assembly (sensor 1828 and metamaterial filter 1826) in the visible band as described previously. The broadband coherent light from a super-continuum source 1802 was pre-conditioned by a set of mirrors (1804, 1808, 1810, 1812) and an achromatic biconcave lens 1806 to expand and collimate the beam. In the calibration assembly, an achromatic lens 1814 (AC254-100-A, f=100 mm, Thorlabs) focuses light onto the 150 µm-diameter pinhole 1818 with a piece of diffuser 1816 glued on its backside. The pinhole, together with the achromatic lens, is mounted onto a two-axis motor stage 1820 (Z825B, Thorlabs), which scans the object plane in both X and Y directions via actuators 1822 and 1823. The stepping resolution was 0.1 µm. Then, the imaging lens 1824 (MVL12WA, f=12 mm, Thorlabs), the metamaterial filter 1826 and the monochrome CMOS sensor 1828 (DMM 22BUC03-ML, The Imaging Source) were assembled to make the multi-spectral imager. The metamaterial filter and the sensor were separated by a gap d. The super-continuum source (SuperK EXTREME EXW-6, NKT Photonics) was equipped with a tunable bandpass filter (VARIA, NKT Photonics), which selects the wavelengths from 430 nm to 718 nm with 12 nm spacing and 12 nm bandwidth. Note that the super-continuum source, the motor stage and the sensor are all controlled and synchronized via a custom-built LabView program 1830. In this example, the system was calibrated for the following dimensions of the scene: (x, y, λ, t).

A new calibration system can be used for all the 9 dimensions of the scene: (x, y, z, λ, t, $S_1$, $S_2$, $S_3$, $S_4$). First, a 3D scanning stage can be used for the pinhole to obtain the system response in (x, y, z). For the polarization degree of freedom, a liquid-crystal based full-wave variable retarder can be oriented in the input beam. This component can be used in conjunction with the wavelength filter and thereby, the system can be calibrated in response for all dimensional parameters.

These systems can image within the full visible and NIR bands with number of bands of 16 or more and overall metafilter-transmission efficiency of greater than 99%.

While the flowcharts presented for this technology may imply a specific order of execution, the order of execution may differ from what is illustrated. For example, the order of two more blocks may be rearranged relative to the order shown. Further, two or more blocks shown in succession may be executed in parallel or with partial parallelization. In some configurations, one or more blocks shown in the flow chart may be omitted or skipped. Any number of counters, state variables, warning semaphores, or messages might be added to the logical flow for purposes of enhanced utility, accounting, performance, measurement, troubleshooting or for similar reasons.

Some of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more blocks of computer instructions, which may be organized as an object, procedure, or function. Nevertheless, the executables of an identified module need not be physically located together, but may comprise disparate instructions stored in different locations which comprise the module and achieve the stated purpose for the module when joined logically together.

Indeed, a module of executable code may be a single instruction, or many instructions and may even be distributed over several different code segments, among different programs and across several memory devices. Similarly, operational data may be identified and illustrated herein within modules and may be embodied in any suitable form and organized within any suitable type of data structure. The operational data may be collected as a single data set, or may be distributed over different locations including over different storage devices. The modules may be passive or active, including agents operable to perform desired functions.

The technology described here may also be stored on a computer readable storage medium that includes volatile and non-volatile, removable and non-removable media implemented with any technology for the storage of information such as computer readable instructions, data structures, program modules, or other data. Computer readable storage media include, but is not limited to, a non-transitory machine readable storage medium, such as RAM, ROM, EEPROM, flash memory or other memory technology, CD-ROM, digital versatile disks (DVD) or other optical storage, magnetic cassettes, magnetic tapes, magnetic disk storage or other magnetic storage devices, or any other computer storage medium which may be used to store the desired information and described technology. The devices described herein may also contain communication connections or networking apparatus and networking connections that allow the devices to communicate with other devices. Communication connections are an example of communication media. Communication media typically embodies computer readable instructions, data structures, program modules and other data in a modulated data signal such as a carrier wave or other transport mechanism and includes any information delivery media. A "modulated data signal" means a signal that has one or more of its characteristics set or changed in such a manner as to encode information in the signal. By way of example and not limitation, communication media includes wired media such as a wired network or direct-wired connection and wireless media such as acoustic, radio frequency, infrared and other wireless media. The term computer readable media as used herein includes communication media.

Reference was made to the examples illustrated in the drawings and specific language was used herein to describe the same. It will nevertheless be understood that no limitation of the scope of the technology is thereby intended. Alterations and further modifications of the features illustrated herein and additional applications of the examples as illustrated herein are to be considered within the scope of the description.

Furthermore, the described features, structures, or characteristics may be combined in any suitable manner in one or more examples. In the preceding description, numerous specific details were provided, such as examples of various configurations to provide a thorough understanding of examples of the described technology. It will be recognized, however, that the technology may be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements may be devised without departing from the spirit and scope of the described technology.

What is claimed is:
1. A multi-modal imaging device, comprising:
 a sensor array;
 a metamaterial filter oriented adjacent the sensor array and being patterned with pixels having varied physical heights designed to diffract an incoming image to produce an engineered response which is sensitive to 2D spatial coordinates (x,y), time (t), and at least one of depth spatial coordinate (z), spectrum (X), and degree of polarization ($\vec{S}$), and wherein the incoming image is near field, either radiative or reactive; and a memory unit, including instructions that, when executed by a processor: reconstruct the engineered response to produce a reconstructed image which includes the 2D spatial coordinates and at least one of z, $\lambda$, and $\vec{S}$.

2. The device of claim 1, further comprising a lens oriented opposite the metamaterial filter and in a line of sight of the incoming image such that the lens modifies the incoming image.

3. The device of claim 1, wherein the engineered response is also sensitive to coherence of the incoming image.

4. The device of claim 1, wherein the engineered response is sensitive to x, y, z, t, $\lambda$, and $\vec{S}$.

5. The device of claim 1, wherein the sensor array is a CMOS sensor.

6. The device of claim 1, wherein the metamaterial filter is formed of a dielectric.

7. The device of claim 1, wherein the metamaterial filter is oriented directly contacting the sensor array.

8. The device of claim 1, wherein the metamaterial filter is spaced apart from the sensor array to form a gap, and includes at least one of an empty gap and a lens within the gap.

9. The device of claim 1, wherein the device does not include conventional lenses between the sensor array and the incoming image, wherein the conventional lenses include simple lenses, compound lenses, biconvex lenses, plano-convex lenses, plano-concave lenses, positive meniscus lenses, negative meniscus lenses, biconcave lenses, achromatic lenses, diffusers, mirrors, prisms, collimators, phase masks, and spatial light modulators.

10. The device of claim 1, wherein the pixels have a size which is within 2% or less of a smallest wavelength in the incoming image.

11. The device of claim 10, wherein the size is about one-tenth the smallest wavelength.

12. The device of claim 1, wherein the pixels have an aspect ratio of greater than 15:1.

13. The device of claim 1, wherein the reconstruction is performed using multi-stage reconstruction with both high and low resolution.

14. The device of claim 1, wherein the reconstruction is performed using inferencing from raw data.

15. The device of claim 1, wherein the reconstruction is performed such that the reconstructed image is coarse.

16. A filter assembly, comprising:
a metamaterial filter can be adapted to be oriented adjacent a sensor array and patterned with pixels having varied physical heights designed to diffract an incoming image to produce an engineered response which is sensitive to 2D spatial coordinates (x,y), time (t), and at least one of depth spatial coordinate (z), spectrum ($\lambda$), and degree of polarization ($\vec{S}$), and wherein the incoming image is near field, either radiative or reactive; and
a memory unit, including instructions that, when executed by a processor: reconstruct the engineered response to produce a reconstructed image which includes the 2D spatial coordinates and at least one of z, X, and S.

17. The filter assembly of claim 16, wherein the engineered response is also sensitive to coherence of the incoming image.

18. The filter assembly of claim 16, wherein the engineered response is sensitive to x, y, z, t, $\lambda$, and $\vec{S}$.

19. The filter assembly of claim 16, wherein the metamaterial filter is formed of a dielectric.

20. The filter assembly of claim 16, wherein the metamaterial filter is oriented directly contacting the sensor array.

21. The filter assembly of claim 16, wherein the metamaterial filter is spaced apart from the sensor array to form a gap, and includes at least one of an empty gap and a lens within the gap.

22. The filter assembly of claim 16, wherein the reconstruction is performed using multi-stage reconstruction with both high and low resolution.

23. The filter assembly of claim 16, wherein the reconstruction is performed using inferencing from raw data.

24. The filter assembly of claim 16, wherein the reconstruction is performed such that the reconstructed image is coarse.

25. A method for designing a filter for an imaging system, comprising:
creating a vectorial electromagnetic model of the imaging system which includes a metamaterial filter having an array of pixel elements, wherein the vectorial electromagnetic model is a forward model and includes an engineered response which is sensitive to 2D spatial coordinates (x,y), time (t), and at least one of depth spatial coordinate (z), spectrum ($\lambda$), and degree of polarization ($\vec{S}$); and
optimizing heights of the pixel elements of the metamaterial filter using a gradient-based optimization algorithm to produce an optimized metamaterial filter.

26. The method of claim 25, wherein the engineered response is sensitive to x, y, z, t, $\lambda$, and $\vec{S}$.

* * * * *